US012572840B2

(12) United States Patent
Samuel et al.

(10) Patent No.: US 12,572,840 B2
(45) Date of Patent: Mar. 10, 2026

(54) CONTROLLING QUANTUM COMMUNICATION VIA QUANTUM MEMORY MANAGEMENT

(71) Applicant: Cisco Technology, Inc., San Jose, CA (US)

(72) Inventors: Louis Gwyn Samuel, Swindon (GB); Santanu Ganguly, Ashford (GB); Maria Gragera Garces, London (GB); Luca Della Chiesa, Cesenatico (IT)

(73) Assignee: CISCO TECHNOLOGY, INC., San Jose, CA (US)

( * ) Notice: Subject to any disclaimer, the term of this patent is extended or adjusted under 35 U.S.C. 154(b) by 819 days.

(21) Appl. No.: 17/898,620

(22) Filed: Aug. 30, 2022

(65) Prior Publication Data

US 2024/0070514 A1      Feb. 29, 2024

(51) Int. Cl.
*G06N 10/80* (2022.01)

(52) U.S. Cl.
CPC .................................... *G06N 10/80* (2022.01)

(58) Field of Classification Search
None
See application file for complete search history.

(56) References Cited

U.S. PATENT DOCUMENTS

2020/0201655 A1    6/2020  Griffin et al.
2021/0175976 A1    6/2021  Rahman

2022/0006534 A1    1/2022  Reilly
2022/0036230 A1 *  2/2022  Wang ........................ G06N 3/04
2022/0201655 A1 *  6/2022  Kang .................. H04W 72/563
2023/0237359 A1 *  7/2023  Rogers ................... G06N 10/20
                                                          706/62
2024/0005195 A1 *  1/2024  Griffin ................... G06N 10/00
(Continued)

FOREIGN PATENT DOCUMENTS

NL        2026015 B1 *  3/2022  ........... H04L 9/0855
WO    2021/016095 A1    1/2021

OTHER PUBLICATIONS

Mg De Andrade, et al., "A quantum walk control plane for distributed quantum computing in quantum networks," http://arxiv.org/abs/2106.09839v2, Nov. 5, 2022, 12 pages.
(Continued)

*Primary Examiner* — Xuyang Xia
(74) *Attorney, Agent, or Firm* — Edell, Shapiro & Finnan, LLC

(57)              ABSTRACT
A quantum memory manager (QMM) of a source endpoint obtains a memory request from a quantum application for quantum memory blocks. The source endpoint negotiates with a destination endpoint to determine a memory lifetime value that includes a minimum decoherence time for qubits stored at the source endpoint and qubits stored at the destination endpoint. The QMM allocates a quantum memory block of a plurality of qubit storage locations to the quantum application based on the memory lifetime value. The QMM receives communication qubits that are entangled with destination qubits sent to the destination endpoint, and stores the communication qubits in the quantum memory block. Each particular communication qubit of the communication qubits is entangled with a particular destination qubit of the destination qubits.

20 Claims, 11 Drawing Sheets

(56)                References Cited

U.S. PATENT DOCUMENTS

2024/0028942 A1 *    1/2024    Griffin    ..................    G06N 10/80

OTHER PUBLICATIONS

Kompella, et al., "Advertising Entanglement Capabilities in Quantum Networks," draft-kaws-qirg-advent-00, IETF, QIRG, Internet-Draft, www.watersprings.org/pub/id/draft-kaws-qirg-advent-00.html, Oct. 21, 2018, 11 pages.
Dahlberg, et al., "A Link Layer Protocol for Quantum Networks," https://arxiv.org/pdf/1903.09778, Mar. 23, 2019, 56 pages.
Kozlowski, et al., "Designing a Quantum Network Protocol," CoNEXT '20, Dec. 2020, 16 pages.

* cited by examiner

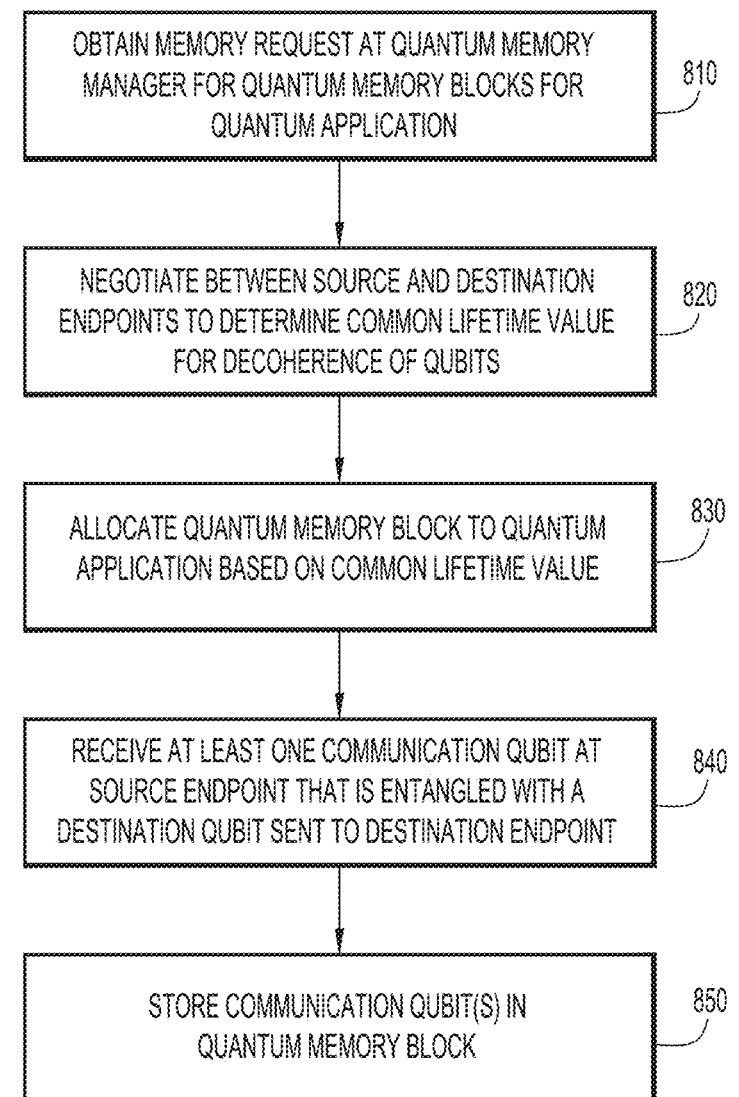

800

OBTAIN MEMORY REQUEST AT QUANTUM MEMORY MANAGER FOR QUANTUM MEMORY BLOCKS FOR QUANTUM APPLICATION    810

NEGOTIATE BETWEEN SOURCE AND DESTINATION ENDPOINTS TO DETERMINE COMMON LIFETIME VALUE FOR DECOHERENCE OF QUBITS    820

ALLOCATE QUANTUM MEMORY BLOCK TO QUANTUM APPLICATION BASED ON COMMON LIFETIME VALUE    830

RECEIVE AT LEAST ONE COMMUNICATION QUBIT AT SOURCE ENDPOINT THAT IS ENTANGLED WITH A DESTINATION QUBIT SENT TO DESTINATION ENDPOINT    840

STORE COMMUNICATION QUBIT(S) IN QUANTUM MEMORY BLOCK    850

FIG.8

CONTROLLING QUANTUM COMMUNICATION VIA QUANTUM MEMORY MANAGEMENT

TECHNICAL FIELD

The present disclosure relates to quantum computing and quantum network communication.

BACKGROUND

Quantum networking is a relatively new concept that may be used to extend the potency of quantum computing by enabling several smaller quantum computers to combine their processing power. Communicating quantum states over the distance between quantum computers presents challenges to overcome. One implementation of quantum communication over long distances incorporates quantum entanglement and quantum teleportation. Both of these mechanisms involve detecting and measuring the state of individual particles, such as photons or matter qubits.

In quantum networking, the transmission channel is a quantum channel encoding a quantum state that is shared between the source endpoint and the destination endpoint in an entangled state. Mathematically, the information imparted in a quantum channel may be the tensor product of a data qubit and a communication qubit that produces a two-qubit composite state. To recover the information at the destination endpoint, the source endpoint takes a measurement of the data qubit projection onto the entangled communication qubit of the quantum channel. The source endpoint sends the measurement results to the destination endpoint, and the destination endpoint performs a unitary transformation to the destination entangled qubit to recover the data qubit information at the destination. A classical network may route the measurement result to the destination endpoint, enabling the destination endpoint to recover the information in the data qubit as long as the destination endpoint receives and processes the measurement result before the decoherence time of the destination entangled qubit.

BRIEF DESCRIPTION OF THE DRAWINGS

FIG. 8 is a flowchart illustrating operations performed by a source endpoint to prepare for quantum communication, according to an example embodiment.

DETAILED DESCRIPTION

Overview

Figure 1:
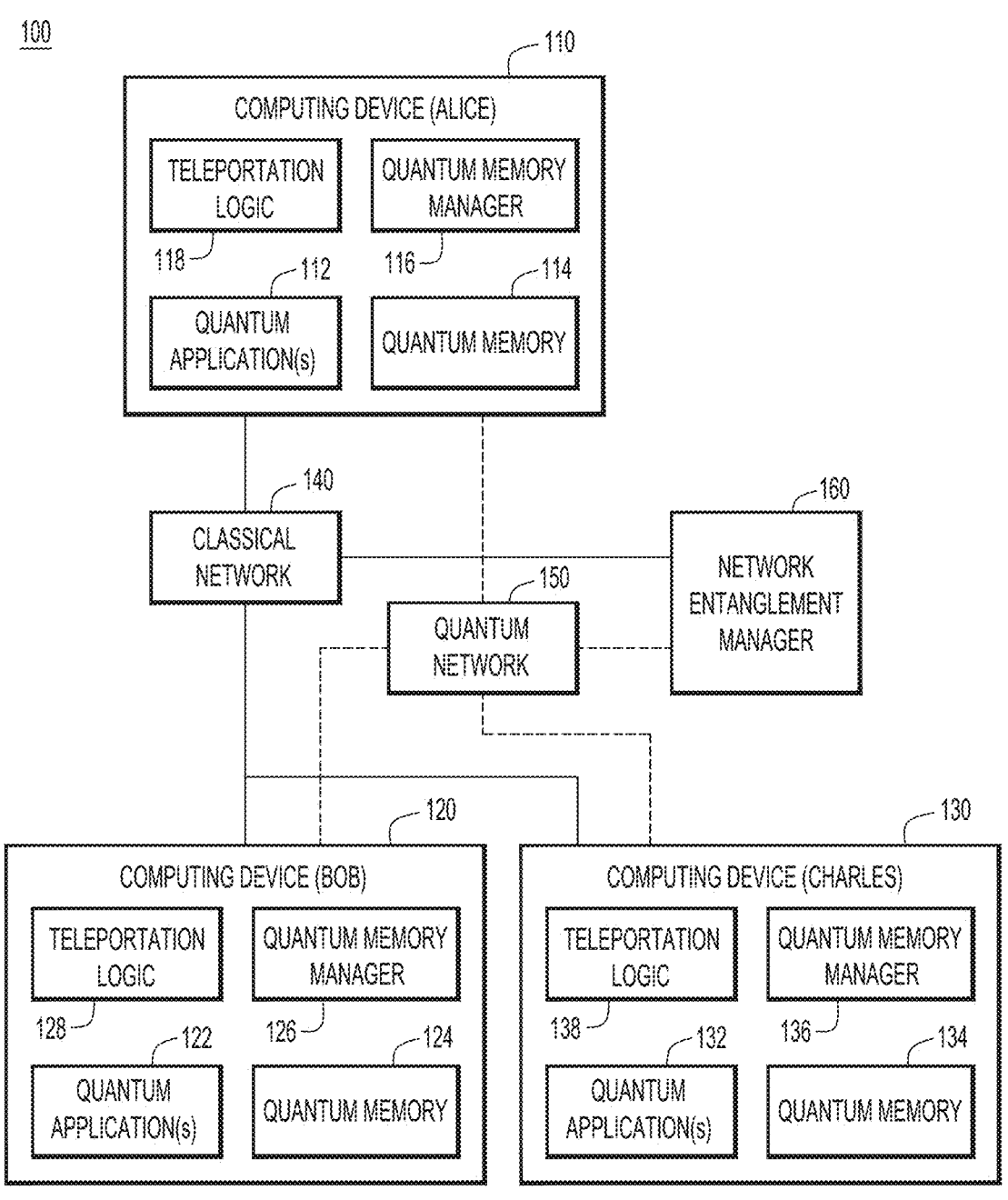
FIG. 1 is simplified block diagram of a quantum networking system between multiple endpoints, according to an example embodiment.

A method is provided to facilitate quantum communication. The method includes obtaining at a quantum memory manager of a source endpoint, a memory request for one or more quantum memory blocks. The memory request includes an application identifier of a quantum application at the source endpoint. The method also includes negotiating with a destination endpoint to determine a memory lifetime value that includes a minimum decoherence time for qubits stored at the source endpoint and qubits stored at the destination endpoint. The method further includes allocating a quantum memory block of a plurality of qubit storage locations to the quantum application based on the memory lifetime value. The method also includes receiving one or more communication qubits that are entangled with one or more destination qubits sent to the destination endpoint, and storing the one or more communication qubits in the quantum memory block. Each particular communication qubit of the one or more communication qubits is entangled with a particular destination qubit of the one or more destination qubits.

Example Embodiments

Quantum networking is a relatively new concept, which may extend the potency of quantum computing by enabling multiple smaller quantum computers to be linked together. This requires communicating quantum states between the quantum computers over a distance, which presents a challenge to typical quantum network technology. One way of implementing quantum communication over long distances is via the dual mechanisms of quantum entanglement and quantum teleportation. Both of these mechanisms require the system to detect and measure the state of individual particles (e.g., photons or matter). The techniques presented herein address the challenges of communicating quantum state information over distances, e.g., between a quantum computer at a source endpoint and a quantum computer at a destination endpoint. The techniques presented also provide a method of resource management tied to quantum memory management by including application driven memory allocation by the quantum memory manger while maintaining fidelity of entanglement at acceptable standards.

In classical networks, when a packet is transmitted over the path between the source and the destination, the packet may traverse one or more intermediate nodes. As the packet traverses an intermediate node, the intermediate node may store and forward the packet. The packet may arrive at a queue/buffer, where the node stores the packet temporarily while the node makes a forwarding decision. The intermediate node may base the forwarding decision on a routing lookup table that indicates an output port to which the packet is to be forwarded. In the processing of the packet, the intermediate node may store and forward the packet through multiple stages of the intermediate node before the packet emerges for transmission on an outgoing network link.

In the classical system, each node stores and processes the packet independently from the neighboring nodes, and the information conveyed by the bits in the packet are self-contained. The intermediate node may move/copy bits within the packet or move/copy the entire packet without affecting the information encoded in the bits. When the packet reaches the destination endpoint, the packet is entirely decoupled from the original source endpoint. As long as each intermediate node has sufficient buffer/queue resources to receive the packet, the packet can reach the destination.

Quantum network communication presents additional physical challenges due to the need for the source endpoint and destination endpoint to share a quantum entanglement. These challenges may include providing the communication resources (e.g., entangled pairs of qubits) and determining the parameters (e.g., entanglement rate, fidelity, etc.) of the resources needed to communicate between different endpoints. A simple quantum communication system may include two parties communicating a single information qubit, which may be accomplished with a single entangled pair of communication qubits. However, adding multiple potential source endpoints and multiple potential destination endpoints (e.g., a peer-to-peer network with multiple peer endpoints) presents additional challenges for the quantum network infrastructure to overcome.

The techniques presented herein address a need for communicating parties to exchange more than a single qubit of information simultaneously, and a need for the quantum networking system to identify and support quantum communication channels for specific quantum applications. For instance, if a source endpoint includes more than one concurrent quantum application and/or the source endpoint is exchanging more than one qubit, the endpoints assign pairs of entangled communication qubits to specific quantum applications, enabling each quantum channel to operate independently.

Additionally, the techniques presented herein incorporate the concept of quantum memory management to sustain entanglement between the communicating parties at a desired rate and fidelity. In one example, the techniques presented herein identify communicating blocks of quantum memory between the source endpoint and the destination endpoint. The quantum memory management of the quantum memory blocks triggers the establishment of a sufficient number of quantum channels to sustain the communication needs of the demand disclosed by the quantum application.

Each quantum application requiring network communication may be allocated a block of quantum memory at each communication endpoint, i.e., at the source endpoint and at the destination endpoint. The capacity for any quantum application to communicate from the source endpoint or the destination endpoint may be determined by the size of the quantum memory and by any limitations of the available network capacity at these nodes.

Referring now to FIG. 1, a quantum communication system 100 is shown to communicate qubits between quantum computing devices. The system 100 includes a computing device 110 (e.g., Alice) with at least one quantum application 112, a quantum memory 114, a Quantum Memory Manager (QMM) 116, and teleportation logic 118. The quantum application 112 is configured to allow the computing device 110 to measure and manipulate quantum information (e.g., qubits). The quantum memory 114 is configured to store the qubits on which the quantum applications 112 operate. The QMM 116 is configured to coordinate the storage of qubits in the quantum memory 114 with entities that interact with the qubits. The teleportation logic 118 is configured to allow the computing device 110 to send or receive qubits with a remote computing device.

The quantum communication system 100 also includes a computing device 120 (e.g., Bob) and a computing device 130 (e.g., Charles). The computing devices 120 and the computing device 130 include quantum applications 122 and quantum applications 132, respectively, which are analogous to the quantum applications 112 in the computing device 110. Similarly, the computing devices 120 and the computing device 130 include quantum memory 124 and quantum memory 134, respectively, which are analogous to the quantum memory 114 in the computing device 110. Additionally, the computing device 120 and the computing device 130 include a QMM 126 and a QMM 136, respectively, which are analogous to the QMM 116 in the computing device 110. Further, the computing device 120 and the computing device 130 include teleportation logic 128 and teleportation logic 138, respectively, which are analogous to the teleportation logic 118 in the computing device 110.

In other words, the quantum communication system 100 includes three endpoints (i.e., computing device 110, computing device 120, and computing device 130) that are connected by a classical network 140 and a quantum network 150. The classical network 140 communicates through classical packets, which may be optical or electrical, that encode information in bits that may be stored, forwarded, duplicated, modified, and reconstructed at each intermediate node. In one example, the classical network 140 may be separated logically into a control plane carrying control messages and a data plane carrying data messages. The quantum network 150 communicates information encoded in qubits, which cannot be duplicated due to the no-cloning theorem. In another example, the quantum network 150 may transport quantum control qubits and/or quantum data qubits.

The quantum communication system 100 also includes a network entanglement manager 160 that is configured to provides entangled pairs of qubits for endpoints on the quantum network 150. The network entanglement manager 160 may be configured to coordinate entanglement swapping at intermediate nodes of the quantum network 150 to enable endpoints (e.g., computing devices 110, 120, or 130) to receive entangled pairs of qubits without a direct connection between the endpoints. In one example, the entanglement swaps may be coordinated through the classical network 140 through known mechanisms.

In one example, the computing device 110 may include multiple quantum applications 112 that are configured to operate independently on different sets of qubits. Alternatively, multiple quantum applications 112 may be configured to operate on the same qubits but at different times. The quantum applications 112 may measure qubits along any basis, collapsing the qubit into a measurement result along a specific basis. Additionally, the quantum applications 112 may manipulate qubits through transformations or gates (e.g., unitary, Pauli-XYZ, Hadamard, phase, Controlled NOT, Controlled Z, swap, or Toffoli) that operate on the qubits assigned to the quantum applications 112.

In another example, the quantum memory 114 is configured to store a plurality of qubits without measurement. The quantum memory 114 may store qubits in different properties (e.g., polarization, spin, etc.) of various physical forms (e.g., photons, electrons, nuclear/atomic elements, superconducting elements, phonons, quantum dots, etc.). The quantum memory 114 may be partitioned (e.g., logically or physically) into one or more blocks or storage locations for storing one or more qubits, as described with respect to FIG. 2. In some instances, the quantum memory 114 may be partitioned to store qubits for the quantum control plane separately from qubits for the quantum data plane.

In a further example, the QMM 116 is configured to manage the qubits stored in the quantum memory 114. Additionally, the QMM 116 coordinates the assignment of quantum memory locations to the quantum applications 112. The QMM 116 may also communicate with the QMM 126 or the QMM 136 to coordinate parameters for communicating qubits between the computing device 110 and the computing device 120 or the computing device 130, respectively.

For ease of understanding, hereinafter, the computing device 110 (e.g., Alice) may also be referred to as the source endpoint 110 and the computing device 120 (e.g., Bob) may also be referred to as the destination endpoint 120. However, in general, any of the endpoint computing devices (e.g., computing device 110, 120, or 130) may function as the source endpoint or as the destination of a quantum communication.

Figure 2:
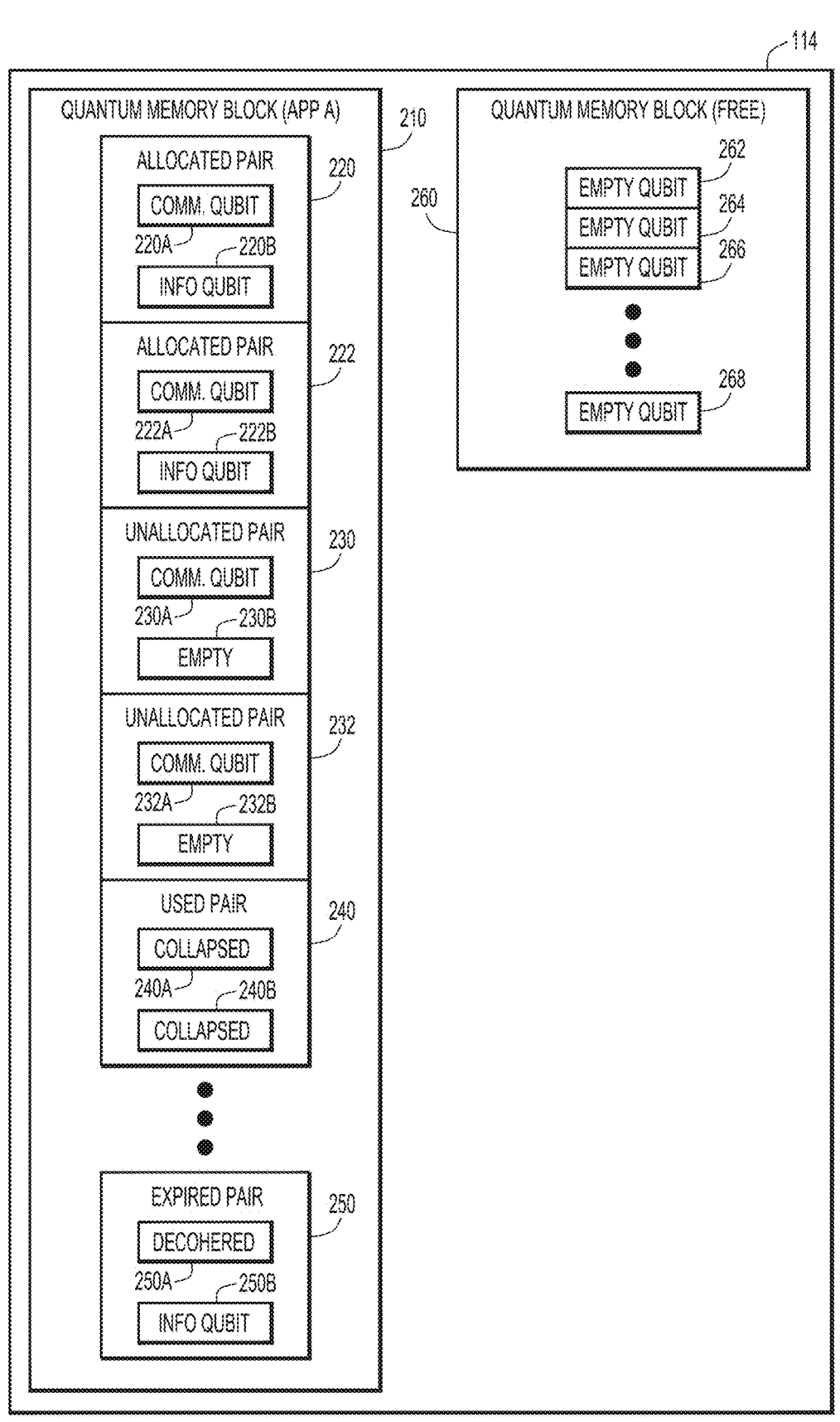
FIG. 2 is a simplified block diagram of a quantum memory storage device, according to an example embodiment.

Referring now to FIG. 2, a simplified block diagram shows an example of the quantum memory 114. The quantum memory 114 includes a quantum memory block 210 that has been assigned to a quantum application (e.g., Application A). Within the quantum memory block 210 assigned to the quantum application, the qubit memory storage locations are divided into storage pairs of associated qubit storage locations. Each storage pair is tagged to indicate the state of the qubits that are stored in the qubit storage locations.

The quantum memory block includes an allocated storage pair 220 comprising a qubit storage location 220A storing a communications qubit and a qubit storage location 220B storing an information qubit. Similarly, an allocated storage pair 222 includes a qubit storage location 222A storing a communications qubit and a qubit storage location 222B storing an information qubit. Allocated storage pairs of qubit storage locations enable the information qubit to influence a communications qubit, which is entangled with a qubit at the destination endpoint, and generate a composite state between the information qubit and the communications qubit.

Additionally, the quantum memory block includes an unallocated storage pair 230 comprising a qubit storage location 230A storing a communications qubit and a qubit storage location 230B that is empty. Similarly, a storage unallocated pair 232 includes a qubit storage location 232A storing a communications qubit and a qubit storage location 232B that is empty. Unallocated storage pairs of qubit storage locations are pairs that have been prepared with a communications qubit that is entangled with a corresponding qubit at the destination endpoint, but has not been associated with an information qubit from a quantum application.

Further, the quantum memory block includes a used storage pair 240 comprising qubit storage locations 240A and 240B that have been measured to enable an information qubit to be sent to the destination endpoint. The composite state between the information qubit and the communications qubit that was stored in the qubit storage locations 240A and 240B collapses when it is measured. The used storage pair 240 may be repopulated and reclassified as an unallocated storage pair by storing another communications qubit in the qubit storage location 240A.

The quantum memory block 210 also includes an expired storage pair 250 comprising a qubit storage location 250A storing a decohered qubit and a qubit storage location 250B storing an information qubit. The expired storage pair 250 provides an indication that the communications qubit that was stored in the qubit storage location 250A decohered and lost the entanglement with the qubit at destination endpoint before the information qubit stored in the qubit storage location 250B could be transferred to the destination endpoint. The expired storage pair 250 may be used to determine whether the quantum application is over-subscribed and requesting more resources (e.g., entangled pairs) from the network than the quantum application is able to use. Additionally, the expired storage pair 250 may be expired due to the difference in coherence times between the quantum memory 114 at the source endpoint 110 and the quantum memory 124 at the destination endpoint 120. In other words, the source endpoint and the destination endpoint may use different materials for their respective quantum memories, and the different materials may have different coherence times.

The quantum memory block 210 may also include a free quantum memory block 260 with qubit storage locations 262, 264, 266, and 268. The free quantum memory block 260 corresponds to quantum memory resources that have not been assigned to a particular quantum application. Additionally, the quantum memory 114 may include other memory blocks (not shown in FIG. 2) that are assigned to different quantum applications.

In one example, the size of the quantum memory block (e.g., quantum memory block 210) assigned to a particular quantum application may be determined by the communication needs of the particular quantum application. Additionally, the size of the quantum memory block 210 assigned to a quantum application may adjust based on the needs and capabilities of the quantum application (e.g., processing speed at the source endpoint and/or the destination endpoint) and the quantum network (e.g., entangled pair generation rate).

The tags for the storage pairs (e.g., storage pairs 220, 222, 230, 232, 240 and 250) may be used to track the resource requirements (e.g., number of entangled pairs) of the quantum application. The tag assigned to each storage pair may be updated during the quantum communication process to indicate the state of the storage pair. In one example, a storage pair is tagged as unallocated after the source endpoint 110 has received and stored a communications qubit (i.e., half of an entangled pair of qubits provided by the quantum network). Additional details describing the population of storage pairs to generate unallocated storage pairs are included with respect to FIG. 5

Once the quantum application stores an information qubit in the storage pair, allowing the information qubit and communications qubit to define a composite state, then the storage pair is tagged as allocated. After the composite state has been measured to generate measurement results that enable the destination endpoint to transfer the information qubit from the source endpoint to the destination endpoint, the storage pair is tagged as used. Additional details related to allocated storage pairs and used storage pairs are described with respect to FIG. 6. A used storage pair or an expired storage pair may be repopulated with an additional communications qubit, at which point the storage pair would be tagged as unallocated. Additional details related to repopulating used/expired storage pairs are described with respect to FIG. 7.

If an allocated storage pair is not measured before the communications qubit or the information qubit decoheres, then the storage pair is tagged as expired, and may be repopulated with a new communications qubit. Similarly, an unallocated storage pair may be tagged as expired if the communications qubit decoheres before an information qubit is stored in the storage pair. If the information qubit decoheres, then the quantum memory manager may notify the quantum application of the failure and restart the quantum communication.

In one example, a lifetime timer associated with each storage pair may be started when the communications qubit is stored in the storage pair. Once the lifetime timer expires, the storage pair is tagged as expired if a composite state in the storage pair has not been measured. In another example, the length of the lifetime timer is set to maintain available communication qubits for any information qubits from a quantum application. Maintaining available communication qubits enables the source endpoint 110 to communicate the information qubits quickly before the information qubit approaches decoherence. Expired storage pairs typically indicate a mismatch between the resources requested by the quantum application and the resources actually used by the quantum application. Handling of expired storage pairs is discussed in additional detail with respect to FIG. 9A and FIG. 9B.

In the examples of quantum communication channels described hereinafter with respect to FIGS. 3-7, the quantum applications at the source endpoint and the destination endpoint have already determined a communication load (e.g., how many qubits to transfer per second) and any memory requirements (e.g., a number of qubits that will be stored/transferred per communication epoch). As used herein, a communication epoch may be defined by any scheduling system (e.g., Time-Division Multiple Access (TDMA)). These parameters may be used by the QMM to set minimum levels of quantum memory used for communication once the quantum memory is allocated. The minimum memory level may be used by the quantum application to determine whether quantum communication from the source endpoint to the destination endpoint is possible.

Figure 3:
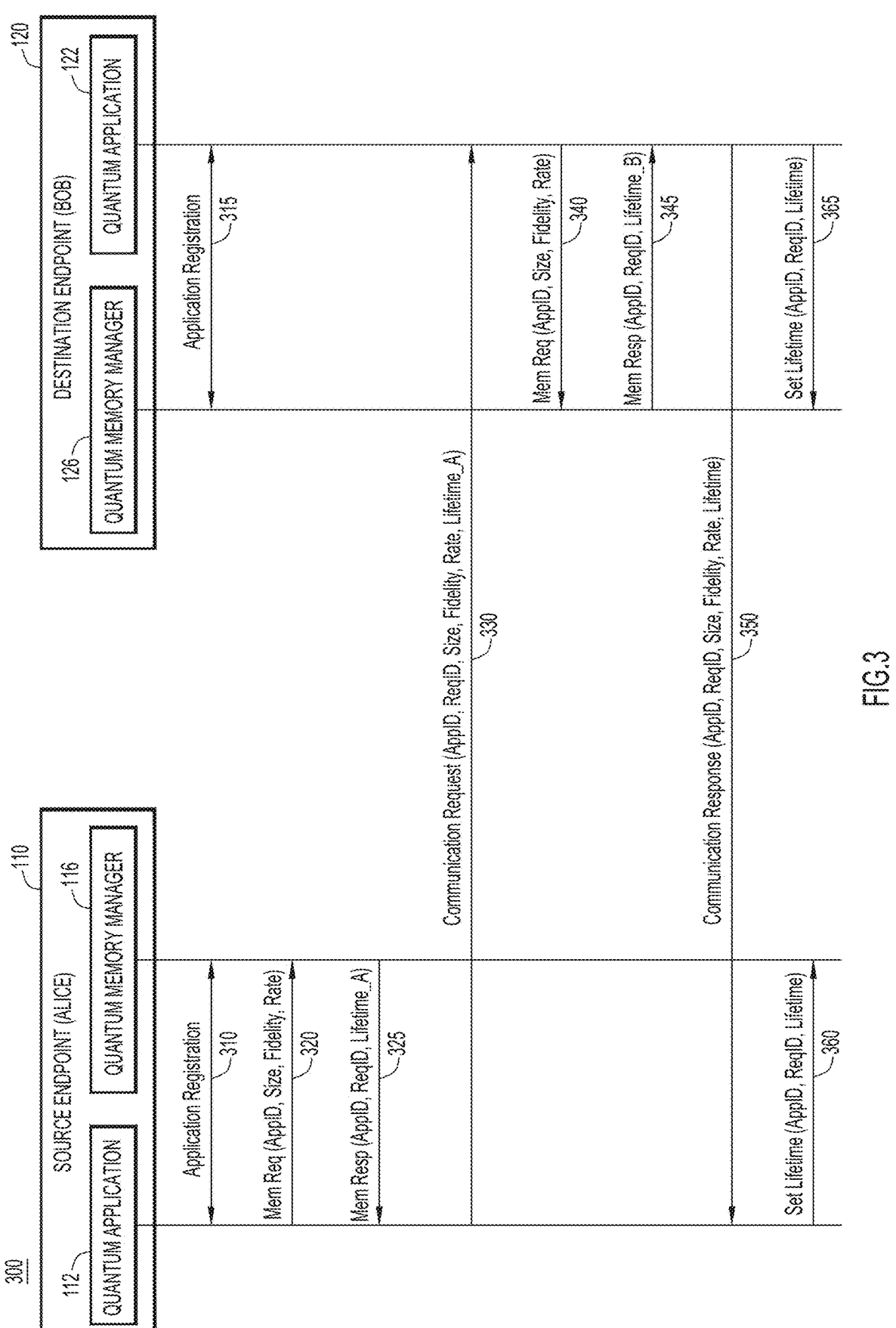
FIG. 3 is a message flow diagram illustrating the initialization of a quantum network communication mediated by quantum applications on the source endpoint and the destination endpoint, according to an example embodiment.

Referring now to FIG. 3, a message flow 300 illustrates an initiation process for negotiating a quantum communication channel between a source endpoint 110 and a destination endpoint 120. In FIG. 3, the negotiation is controlled by quantum application 112 and quantum application 122 on the source endpoint 110 and the destination endpoint 120, respectively. In the application registration 310, the quantum application 112 registers with the QMM 116 at the source endpoint 110. In one example, the QMM 116 assigns an application identifier (e.g., a Universally Unique Identifier (UUID), AppID) to the quantum application 112. In another example, the quantum application 122 may provide the application identifier to the QMM 116 in the application registration 310. Additionally, the QMM 116 may determine whether a specific AppID is unique for the quantum communication system 100 as part of the registration of the quantum application 112 to prevent different quantum applications from being associated with the same AppID.

Similarly in the application registration 315, the quantum application 122 registers with the QMM 126 at the destination endpoint 120. The QMM 126 may assign a different AppID to the quantum application 122 than the QMM 116 assigns to the quantum application 112. Alternatively, the quantum application 112 and the quantum application 122 may be assigned the same AppID. Using the same AppID for both the quantum application 112 and the quantum application 122 may indicate that the quantum application 112 and the quantum application 122 functionally act as a single quantum application that is distributed across the source endpoint 110 and the destination endpoint 120.

To initiate the negotiation between the source endpoint 110 and the destination endpoint 120 for a specific quantum communication, the quantum application 112 sends a memory request 320 to the QMM 116. In one example, the memory request 320 includes the AppID, the size of the memory request (e.g., the number of qubits), a requested entanglement fidelity (e.g., the probability that measurements of two quantum states will be indistinguishable), and a desired communication rate (e.g., the rate of usage of entangled pair states for communication). The QMM 116 performs admission control on the memory request 320 to ensure that the source endpoint 110 can provide the request memory. In one example, the QMM 116 checks any current memory allocations and the expected demand for memory resources as part of the admission control.

If the QMM 116 determines that the source endpoint 110 can satisfy the memory request 320, then the QMM 116 responds to the quantum application 112 with a memory response 325. In one example, the memory response 325 includes the AppID, an identifier specific to the memory request (e.g., ReqID), a grant token, and a lifetime of the quantum memory resources (e.g., Lifetime_A). The combination of the AppID and the ReqID may be used as a unique identifier for future communications related to this quantum channel. The value of the Lifetime_A included in the memory response 325 may include the decoherence time of the quantum memory in the source endpoint 110 that the QMM 116 manages. Additionally, the value of the Lifetime_A may also include a safety margin in addition to the expected decoherence time of the memory resources.

The quantum application 112 sends a communication request 330 to the quantum application 122 in the destination endpoint. In one example, the communication request includes a unique identifier (e.g., AppID+ReqID) for the communication session, the size of the memory used for the communication session (e.g., a number of qubits), a requested entanglement fidelity, a requested communication rate, and a memory coherence parameter (e.g., Lifetime_A) of the memory resources at the source endpoint 110. The quantum application 122 sends a memory request 340 to the QMM 126 with the relevant parameters for communicating with the quantum application 112. In one example, the memory request 340 includes the application identifier (e.g., AppID), the size of memory (e.g., number of qubits) that is being requested, a requested fidelity rate, and a requested communication rate.

The QMM 126 performs admission control on the memory request 340 to ensure that the destination endpoint 120 can provide the request memory. In one example, the QMM 126 checks any current memory allocations and the expected demand for memory resources as part of the admission control. If the QMM 126 determines that the destination endpoint 120 can satisfy the memory request 340, then the QMM 126 responds to the quantum application 122 with a memory response 345. In one example, the memory response 345 includes the AppID, an identifier specific to the memory request (e.g., ReqID), a grant token, and a lifetime of the quantum memory resources (e.g., Lifetime_B). The value of the Lifetime_B included in the memory response 345 may include the decoherence time of the quantum memory in the source endpoint 110 that the QMM 116 manages. Additionally, the value of the Lifetime_B may also include a safety margin in addition to the expected decoherence time of the memory resources. The decoherence time of quantum memory is technology dependent, and may differ between the source endpoint 110 and the destination endpoint 120. In other words, Lifetime_A may be different than Lifetime_B.

After obtaining the memory response 345, the quantum application 122 selects the memory lifetime value to be used in the communication channel between the source endpoint 110 and the destination endpoint 120. For instance, the quantum application 122 may select the smaller of the values between Lifetime_A and Lifetime_B. Selecting a memory lifetime value that is at most the shorter coherence lifetime of the memory resources at either endpoint ensures that both endpoints maintain coherent qubits during a communication epoch.

After selecting an appropriate value for the minimum lifetime of memory resources storing qubits, the quantum application 122 sends a communication response 350 to the quantum application 112 with agreed parameters for the communication channel. In one example, the communication response 350 includes the application identifier (e.g., AppID), the request identifier (e.g., ReqID), the agreed upon memory size (e.g., the number of qubits to allocate), the entanglement fidelity of the communication channel, the communication rate of the communication channel, and the selected lifetime of the memory resources that will be used for the communication channel.

The quantum application 112 provides a message 360 to the QMM 116 that sets the lifetime of qubit storage locations at the value indicated in the communication response 350. Similarly, the quantum application 122 provides a message 365 to the QMM 126 that sets the lifetime of the qubit storage locations at the same minimum lifetime value. The QMM 116 and the QMM 126 may then begin allocating quantum memory resources based on the parameters indicated in the communication response 350. Initially, the quantum memory resources (e.g., storage locations) are empty since they have not been provided with entangled pair halves for communication.

Figure 4:
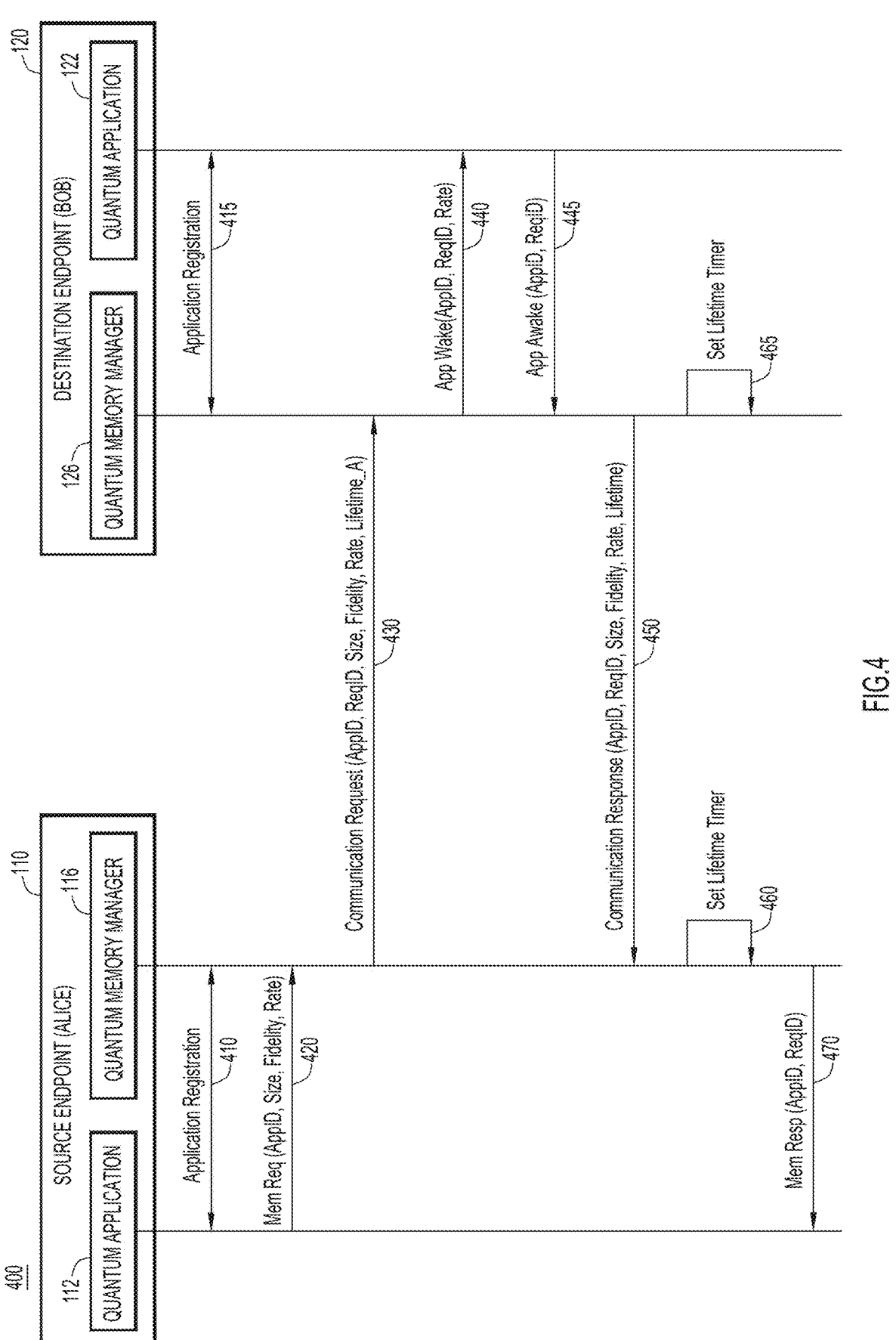
FIG. 4 is a message flow diagram illustrating the initialization of a quantum network communication mediated by quantum memory managers on the source endpoint and the destination endpoint, according to an example embodiment.

Referring now to FIG. 4, a message flow 400 illustrates an initiation process for negotiating a quantum communication channel between a source endpoint 110 and a destination endpoint 120, with the negotiation controlled by the QMMs of the endpoints instead of by the quantum applications as shown in FIG. 3. Similar to the application registrations 310 and 315 shown in FIG. 3, the quantum application 112 and the quantum application 122 register with the QMM 116 and the QMM 126 at 410 and 415, respectively. The quantum application 112 sends a memory request 420 similar to the memory request 320 shown in FIG. 3. In one example, the memory request 420 includes an application identifier (e.g., AppID), the size of the memory request, a requested entanglement fidelity, and a desired communication rate. The QMM 116 performs an admission control on the memory request 420 to determine whether the source endpoint 110 can provide the requested memory resources. The QMM 116 may assign a request identifier (e.g., ReqID) as part of the admission control of the memory request 420.

Rather than immediately responding to the memory request 420 based on the ability of the QMM 116 to provide the necessary memory resources, the QMM 116 sends a communication request 430 to the QMM 126 of the destination endpoint 120 to negotiate the parameters for a communication session. In one example, the communication request 430 includes a unique identifier (e.g., AppID+ ReqID) for the communication session, the size of the memory used for the communication session (e.g., a number of qubits), a requested entanglement fidelity, a requested communication rate, and a memory coherence parameter (e.g., Lifetime_A) of the memory resources at the source endpoint 110.

The QMM 126 at the destination endpoint 120 performs admission control on the communication request 430 to determine whether the destination endpoint 120 can provide the necessary quantum memory resources. In one example, the QMM 126 determines whether the destination endpoint 120 has available quantum memory resources to satisfy the size, fidelity, and communications rate requirements specified in the communication request 430. Additionally, the QMM 126 determines a memory coherence parameter (e.g., Lifetime_B) for the available memory resources.

Upon an admission control determination from the QMM 126 that the destination endpoint 120 has the memory resources to accommodate the communication request 430, the QMM 126 provides a wake message 440 to the quantum application 122. In one example, the wake message 440 includes an application identifier (e.g., AppID), an identifier specific to the communication request 430 (e.g., ReqID), and a requested communication rate. The quantum application 122 obtains the wake message 440 and, responsive to a determination that the destination endpoint 120 will accept the communication request 430, the quantum application 122 provides an acknowledgement message 445 to the QMM 126. The acknowledgement message 445 indicates that the quantum application 122 is capable and prepared to accept a communication from the quantum application 112 in the source endpoint 110. The acknowledgement message 445 may include the application identifier (e.g., AppID) and the request identifier (e.g., ReqID) to echo the wake message 440.

In one example, the wake message 440 and the acknowledgement message 445 serve to ensure that the quantum application 122 on the destination endpoint 120 is a counterpart to the quantum application 112 on the source endpoint 110. If the acknowledgement message 445 includes a different application identifier (e.g., AppID2), then quantum channel negotiation may fail and the QMM 126 may terminate the process. Alternatively, the destination endpoint 120 may take corrective action (e.g., starting a new quantum application) to address the failure and complete the negotiation with the source endpoint 110.

The QMM 126 compares the memory coherence parameter (e.g., Lifetime_A) received in the communication request 430 with the memory coherence parameter (e.g., Lifetime_B) of the quantum memory resources in the destination endpoint to determine a minimum coherence lifetime (e.g., Lifetime) that is less than or equal to both of the memory coherence parameters. In other words, the QMM 126 determines the minimum coherence lifetime as a minimum amount of time that enables both the source endpoint 110 and the destination endpoint 120 to maintain the coherence of a stored qubit.

Once the QMM 126 determines the minimum coherence lifetime, the QMM 126 sends a communication response 450 to the QMM 116. The communication response 450 confirms the communication request 430, and sets the parameters for the quantum communication channel between the source endpoint 110 and the destination endpoint 120. In one example, the communication response 450 includes the application identifier (e.g., AppID), the memory request identifier (e.g., ReqID), the size of the requested memory, the requested entanglement fidelity, the requested communication rate, and the minimum coherence lifetime. The QMM 116 and the QMM 126 both set a lifetime timer at 460 and 465, respectively. The lifetime timer is based on the minimum coherence lifetime determined by the QMM 126 and included in the communication response 450.

Once the QMM 116 confirms the availability of the quantum communication channel between the source endpoint 110 and the destination endpoint 120, the QMM 116 responds to the memory request 420 and provides a memory response 470 to the quantum application 112. In one example, the memory response 470 includes the application identifier (e.g., AppID) and the request identifier (e.g., ReqID).

In comparison to the message flow 300 shown in FIG. 3, which shows a negotiation of a quantum channel between quantum applications, the message flow 400 shown in FIG. 4 shows a negotiation of a quantum channel between the QMM of the respective endpoints. The message flow 400 includes fewer communication steps, and may provide advantages (e.g., speed) to the process of setting up quantum network communication.

Figure 5:
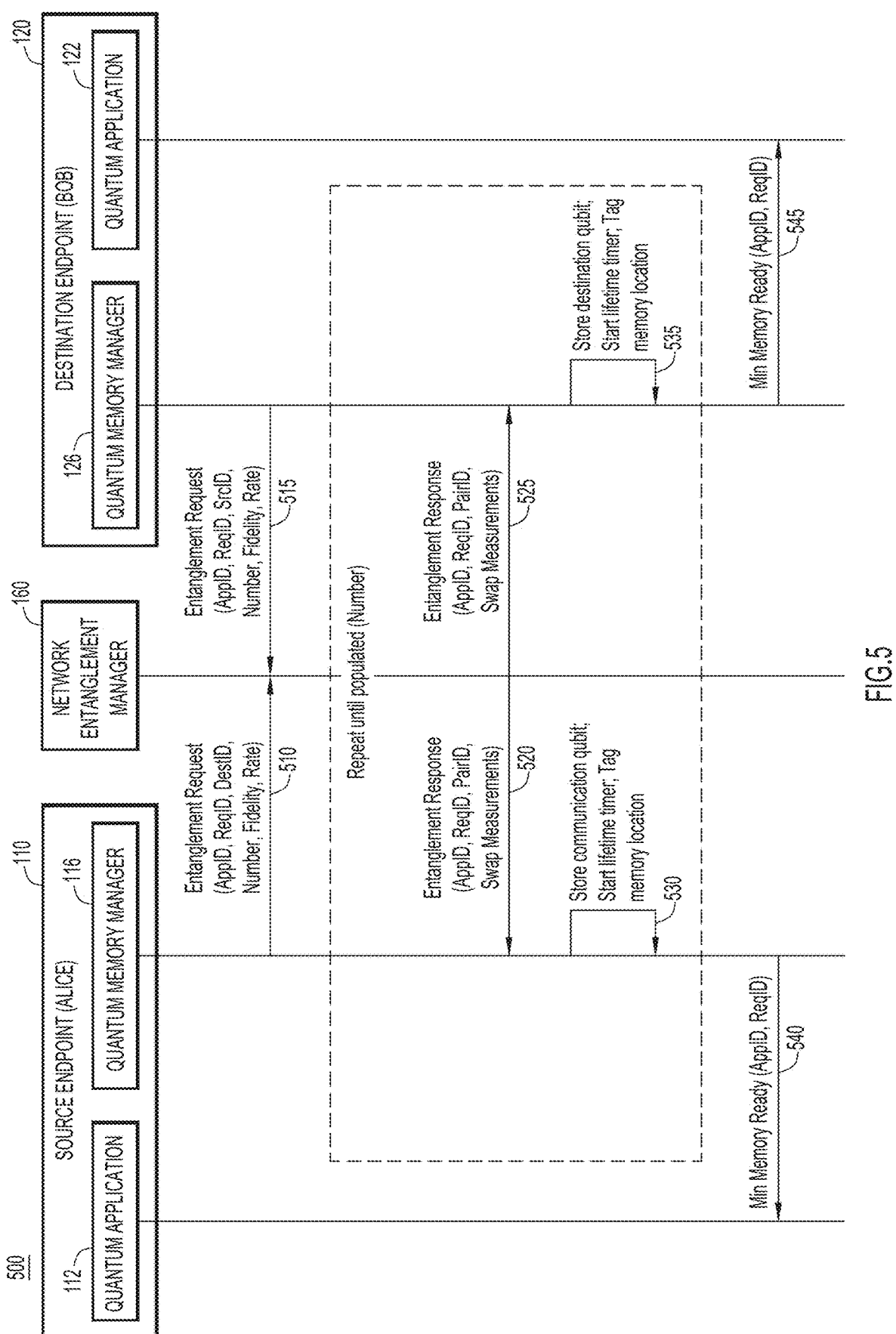
FIG. 5 is a message flow diagram illustrating the population of entangled communication qubits for a quantum network communication between the source endpoint and the destination endpoint, according to an example embodiment.

Referring now to FIG. 5, a message flow 500 illustrates one epoch of an allocation process for populating the quantum memory of the source endpoint 110 and the destination endpoint 120 with entangled pairs of qubits for communicating in a quantum channel. The entangled pairs of qubits are provided by a network entanglement manager 160 that is configured to provide entangled qubits for endpoints attached to a quantum network. In one example, intermediate nodes in the quantum network may swap the entanglement of the pair of qubits to extend the entanglement of a pair of qubits beyond endpoints that are directly connected to the network entanglement manager.

After the parameters of the quantum communication channel have been negotiated (e.g., through the message flow 300 shown in FIG. 3 or the message flow 400 shown in FIG. 4), the QMM 116 of the source endpoint 110 sends an entanglement request 510 to the network entanglement manager 160. In one example, the entanglement request 510 includes an application identifier (e.g., AppID), a request identifier (e.g., ReqID), a destination identifier (e.g., DestID) that identifies the destination endpoint 120, a number of entangled qubits per communication epoch, the required fidelity of the entangled qubits, and the projected rate of qubit regeneration (e.g., the frequency of the communication epochs).

The QMM 126 at the destination endpoint 120 may send a similar entanglement request 515 to the network entanglement manager 160 to provide confirmation to the network entanglement manager 160 that the destination endpoint 120 is configured to receive one of the entangled qubits. In one example, the entanglement request 515 from the destination QMM 126 includes the application identifier (e.g., AppID), the request identifier (e.g., ReqID), a source identifier (e.g., SrcID) that identifies the source endpoint 110, the number of entangled qubits per communication epoch, the required fidelity of the entangled qubits, and the projected rate of qubit regeneration. The network entanglement manager 160 may use the information provided in the entanglement request 510 and/or the entanglement request 515 to track the entanglement requirements of the source endpoint 110 and the destination endpoint 120 through the QMM 116 and the QMM 126, respectively. Additionally, the network entanglement manager 160 may compare the entanglement request 510 from the QMM 116 with the entanglement request 515 from the QMM 126 to ensure that the parameters of the communication channel are consistent for the source endpoint 110 and the destination endpoint 120.

The network entanglement manager 160 generates an entangled pair of qubits and sends an entanglement response 520 to the QMM 116 of the source endpoint 110 with a first half of the entangled pair of qubits. The network entanglement manager 160 sends the second half of the entangled pair of qubits to the QMM 126 of the destination endpoint 120 in an entanglement response 525. In addition to the respective half of the entangled pair of qubits, the entanglement responses 520 and 525 may include the application identifier (e.g., AppID), the request identifier (e.g., ReqID), an identifier for the entangled pair of qubits (e.g., PairID), and any swap measurements that the source endpoint 110 or the destination endpoint 120 needs to swap the entanglement with any intermediary nodes in the quantum network.

The QMM 116 processes the entanglement response 520 by storing the communication qubit (i.e., one qubit from the entangled pair of qubits) in the quantum memory allocated to the quantum application 112 at 530. The QMM 116 also starts a lifetime timer (e.g., a timer that expires after the negotiated minimum coherence time), and tags the storage pair of qubit storage locations with the communication qubit as unallocated. Similarly, the QMM 126 processes the entanglement response 525 by storing the destination qubit (i.e., the other qubit from the entangled pair of qubits) in the quantum memory allocated to the quantum application 122 at 535. The QMM 126 starts a lifetime timer (e.g., a timer that expires after the negotiated minimum coherence time).

In one example, the QMM 126 may also tag the memory location storing the destination qubit to enable the QMM 126 to determine if destination qubits have expired or if the destination qubit has been used to transfer an information qubit from the source endpoint 110. For instance, when the QMM 126 initially stores the destination qubit, the QMM 126 may tag the memory location as populated. Once the destination qubit is used to transfer an information qubit from the source endpoint 110 to the destination endpoint 120, the QMM 126 may tag the memory location with the transferred qubit as used. If the lifetime timer for the storage location of the destination qubit expires before the information qubit is transferred, then the QMM 126 may tag the memory location as expired. Expired memory locations will be repopulated to prepare for the next communication epoch, and the presence of expired memory locations may be used to adjust the parameters of the quantum communication channel as described with respect to FIG. 9A and FIG. 9B.

In another example, as the entangled pairs of qubits are consumed in pairs to teleport the information qubit from the source endpoint 110 to the destination endpoint 120, the QMM 116 and the QMM 126 also tag memory locations symmetrically. For instance, when an information qubit is teleported from the source endpoint 110 to the destination endpoint 120, the QMM 116 and the QMM 126 tag the corresponding memory locations as used at approximately the same time. The QMM 126 tags used memory location slightly later than the QMM 116, due to the time required to send the measurement results from the source endpoint 110 to the destination endpoint 120. Additionally, the QMM 116 and the QMM 126 receive the entangled pairs of qubits at approximately the same time, and tag the corresponding memory locations as unallocated at approximately the same time. Further, the QMM 116 and the QMM 126 use the same value for their respective lifetime timers. As such, the QMM 116 and the QMM 126 tag expired memory locations at approximately the same time, i.e., when the lifetime timer expires.

The act of populating the memory locations with entangled pair halves at the source endpoint 110 and/or the destination endpoint 120 may include a final swap and measurement to store the communication qubit in the medium of the quantum memory. The network entanglement manager 160 continues to send entanglement responses 520 and 525 to the source endpoint 110 and the destination endpoint 120 until at least the requested number of qubits for the communication epoch has been stored in the respective quantum memories. The network entanglement manager 160 may send more than the requested number of entangled pairs of qubits, e.g., to allow for potential losses or to facilitate future communication epochs.

As the entangled pairs of qubits are populated in the quantum memories of the source endpoint 110 and the destination endpoint 120, the QMM 116 and the QMM 126 monitor the number of stored qubits until a minimum level that was negotiated for the communication channel. Once the minimum number of entangled qubits have been stored at the source endpoint 110 and the destination endpoint 120, then the QMM 116 provides a ready message 540 to the quantum application 112 indicating that the quantum communication channel is ready for use. Similarly, the QMM 126 provides a ready message 545 to the quantum application 122 indicating that the quantum communication channel is ready for use. In one example, the ready message 540 and the ready message 545 may include the application identifier (e.g., AppID) and the request identifier (e.g., ReqID). Once the quantum application 112 and the quantum application 122 obtain the ready message 540 and the ready message 545, respectively, the quantum application 112 may begin transferring information qubits to the quantum application 122.

Figure 6:
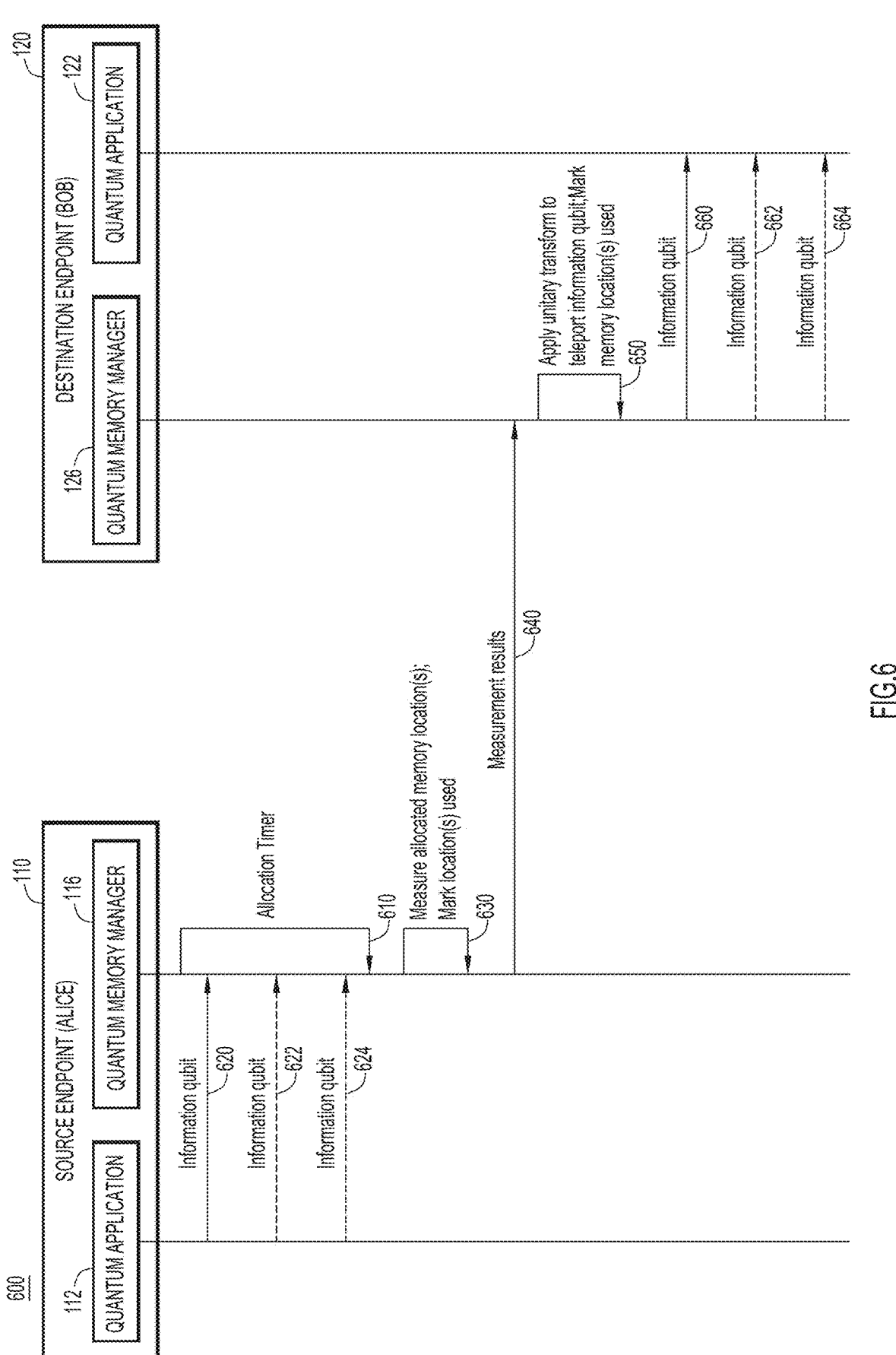
FIG. 6 is a message flow diagram illustrating a quantum network communication epoch teleporting one or more information qubits from the source endpoint to the destination endpoint, according to an example embodiment.

Referring now to FIG. 6, a message flow 600 illustrates one epoch of quantum communication from the source endpoint 110 to the destination endpoint 120 through the QMM 116 and the QMM 126. After the quantum memory in the source endpoint 110 has been populated with communication qubits, and the quantum application 112 has been notified that the minimum memory is ready (e.g., via the ready message 540 shown in FIG. 5), the QMM 116 begins a communication epoch by setting an allocation timer 610. The allocation timer 610 is a sub-interval of the minimum coherence lifetime (e.g., the lifetime parameter negotiated between the source endpoint 110 and the destination endpoint 120 as described with respect to FIG. 3 or FIG. 4). The QMM 116 sets the value of the allocation timer 610 such that all of the message flow 600 can occur before the decoherence of the quantum channels (i.e., before the stored qubits decohere).

The quantum application 112 provides a first information qubit 620 to the QMM 116, which stores the information qubit in an unallocated storage pair that is populated with a communication qubit. The QMM 116 entangles the information qubit 620 with the corresponding communication qubit to generate a composite state of the information qubit and the communication qubit, and tags the storage pair as allocated. The quantum application may provide more than information qubit (e.g., information qubit 622 and information qubit 624) to the QMM 116 as long as all of the information qubits can be teleported to the destination endpoint 120 before the expiration of the allocation timer 610. Each of the information qubits is stored in a storage pair with a corresponding communication qubit to prepare each information qubit for teleportation to the destination endpoint 120. In this way, multiple information qubits (e.g., information qubits 620, 622, and 624) may be transferred to the destination endpoint 120 in a single communication epoch. As the QMM 116 stores each information qubit 620, 622, and 624 in a storage pair, the QMM 116 tags each storage pair as allocated.

Once the quantum application 112 has provided the information qubit(s) for the communication epoch, as signaled by the expiration of the allocation timer 610, the QMM 116 teleports the information qubit(s) of the communication epoch (e.g., information qubits 620, 622, and 624) to the destination endpoint 120. To teleport the information qubit(s), the QMM 116 measures the composite state of each allocated storage pair, and marks the storage pair as used at 630. The QMM 116 sends a measurement results message 640 to the QMM 126 at the destination endpoint 120. In one example, the QMM 116 sends the measurement results message 640 over a classical computer network. The measurement results message 640 may include a unique identifier (e.g., AppID+ReqID) and a list of the measurement results from measuring the each composite state of an information qubit and a corresponding communication qubit.

Once the QMM 126 at the destination endpoint 120 receives the measurement results message 640, the QMM 126 applies a unitary transformation to the corresponding destination qubits (i.e., the other half of the entangled pair of qubits corresponding to the communication qubit stored at the source endpoint 110) at 650. The unitary transformation applied to each destination qubit is based on the measurement results for the composite state generated from the corresponding communication qubit.

Applying the appropriate unitary transform the to the destination qubit recovers the state of the information qubit at the destination endpoint 120. In other words, by applying the appropriate unitary transform indicated by the measurement results, the QMM 126 teleports the information qubit from the source endpoint 110 to the destination endpoint 120. The state of the information qubits 620, 622, and 624 are recovered as information qubits 660, 662, and 664, respectively. The QMM 126 provides the information qubits of the communication epoch (e.g., information qubits 660, 662, and 664) to the quantum application 122 by swapping out the information qubits 660, 662, and 664. After swapping out the information qubits 660, 662, and 664 for use by the quantum application 122, the QMM 126 tags the respective memory locations as used. In one example, as soon as the QMM 116 and the QMM 126 have tagged storage locations as used, the QMM 116 and the QMM 126 may begin repopulating the respective quantum memories with entangled pairs of qubits (i.e., communication qubits at the source endpoint 110 and destination qubits at the destination endpoint 120) in preparation for the next communication epoch.

Figure 7:
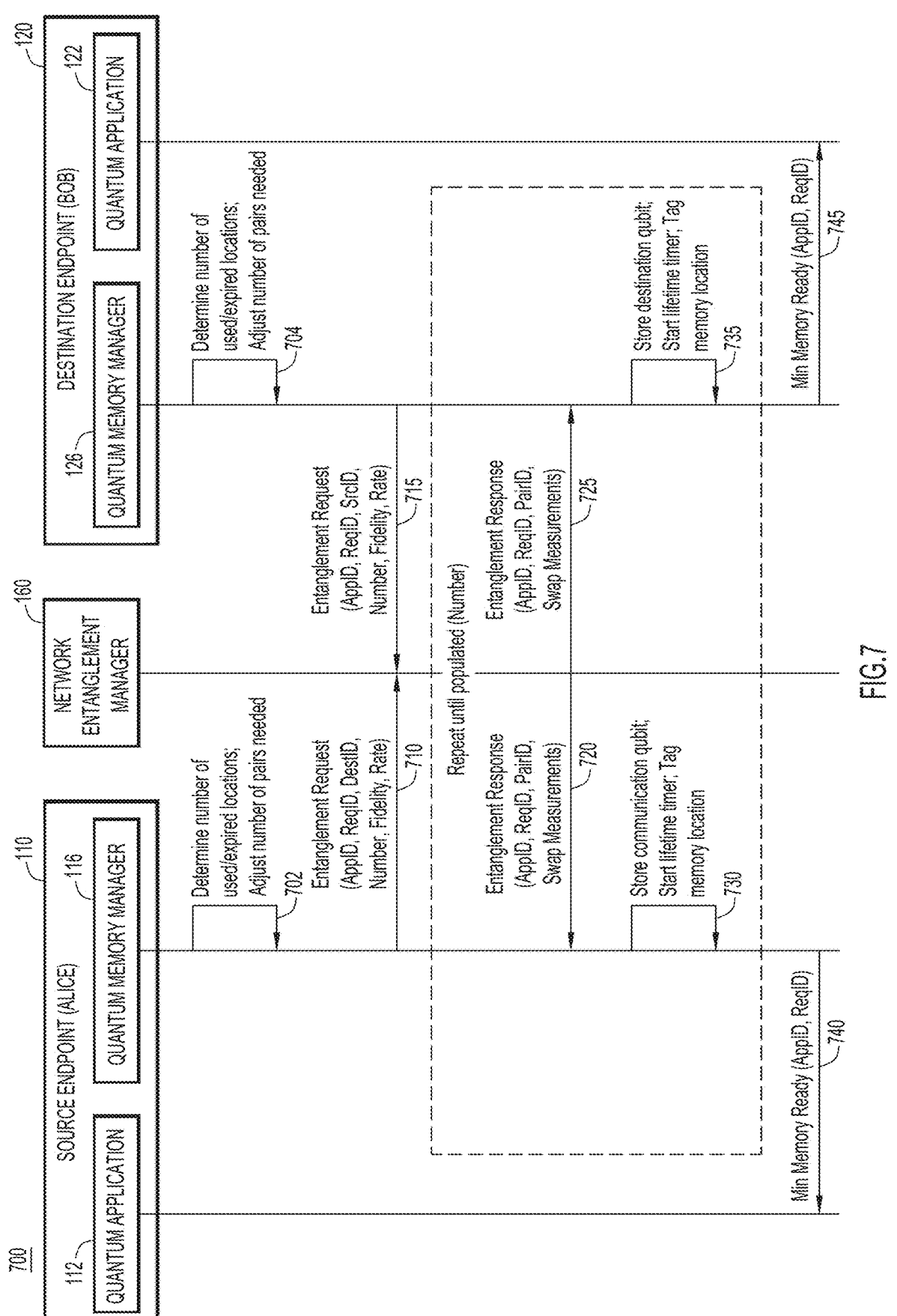
FIG. 7 is a message flow diagram illustrating the repopulation of entangled communication qubits between epochs of a quantum network communication between the source endpoint and the destination endpoint, according to an example embodiment.

Referring now to FIG. 7, a message flow 700 illustrates repopulating the quantum memory of the source endpoint 110 and the destination endpoint 120 with entangled pairs of qubits for the next communication epoch over the quantum channel. At 702, the QMM 116 determines the number of storage pairs that have been tagged used or expired. The QMM 116 may also adjust the number of entangled pairs of qubits to repopulate based on the number of expired storage pairs, as described in more detail with respect to FIG. 9A and FIG. 9B. Similarly, at 704, the QMM 126 determines the number of used or expired memory locations in the destination endpoint 120. The QMM 126 may also adjust the number of entangled pairs of qubits in coordination with the QMM 116 to adjust the usage of quantum network resources.

In one example, the number of entangled pairs of qubits may be adjusted to capture an indication of overall health of the quantum communication system 100. For instance, one or more communication qubits may be set aside for network and application tomography. In other words, the QMM 116 and the QMM 126 may request additional entangled pairs of qubits, and measure the additional communication, without corresponding information qubits, to sample the health (e.g., the ability to produce qubits at a target fidelity and rate) of the quantum communication system 100.

In another example, the QMM 116 and the QMM 126 calculate the number of used memory locations in their respective allocated memory blocks at the end of the allocation timer period. The number of used memory locations may be adjusted based on any expired memory locations, and the QMM 116 and the QMM 126 repopulate the revised number of memory locations for the next allocation/communication epoch.

The remainder of the message flow 700 is similar to the population message flow 500 shown in FIG. 5. The QMM 116 sends an entanglement request 710 to the network entanglement manager 160. The entanglement request 710 includes an application identifier (e.g., AppID), a request identifier (e.g., ReqID), a destination identifier (e.g., DestID) that identifies the destination endpoint 120, a revised number of entangled qubits per communication epoch, the required fidelity of the entangled qubits, and the projected rate of qubit regeneration (e.g., the frequency of the communication epochs).

The QMM 126 at the destination endpoint 120 may send a similar entanglement request 715 to the network entanglement manager 160 to provide confirmation to the network entanglement manager 160 that the destination endpoint 120 is configured to receive one of the entangled qubits. In one example, the entanglement request 715 from the destination QMM 126 includes the application identifier (e.g., AppID), the request identifier (e.g., ReqID), a source identifier (e.g., SrcID) that identifies the source endpoint 110, the revised number of entangled qubits for the next communication epoch, the required fidelity of the entangled qubits, and the projected rate of qubit regeneration. The network entanglement manager 160 may use the information provided in the entanglement request 710 and/or the entanglement request 715 to track the entanglement requirements of the source endpoint 110 and the destination endpoint 120 through the QMM 116 and the QMM 126, respectively.

The network entanglement manager 160 generates an entangled pair of qubits and sends an entanglement response 720 to the QMM 116 of the source endpoint 110 with a first half of the entangled pair of qubits. The network entanglement manager 160 sends the second half of the entangled pair of qubits to the QMM 126 of the destination endpoint 120 in an entanglement response 725. In addition to the respective half of the entangled pair of qubits, the entanglement responses 720 and 725 may include the application identifier (e.g., AppID), the request identifier (e.g., ReqID), an identifier for the entangled pair of qubits (e.g., PairID), and any swap measurements that the source endpoint 110 or the destination endpoint 120 needs to swap the entanglement with any intermediary nodes in the quantum network.

The QMM 116 processes the entanglement response 720 by storing the communication qubit (i.e., one qubit from the entangled pair of qubits) in the quantum memory allocated to the quantum application 112 at 730. The QMM 116 also starts a lifetime timer (e.g., a timer that expires after the negotiated minimum coherence time), and tags the storage pair of qubit storage locations with the communication qubit as unallocated. Similarly, the QMM 126 processes the entanglement response 725 by storing the destination qubit (i.e., the other qubit from the entangled pair of qubits) in the quantum memory allocated to the quantum application 122 at 735. The QMM 126 starts a lifetime timer (e.g., a timer that expires after the negotiated minimum coherence time).

In one example, the QMM 126 may also tag the memory location storing the destination qubit to enable the QMM 126 to determine if destination qubits have expired or if the destination qubit has been used to transfer an information qubit from the source endpoint 110. For instance, when the QMM 126 initially stores the destination qubit, the QMM 126 may tag the memory location as populated. Once the destination qubit is used to transfer an information qubit from the source endpoint 110 to the destination endpoint 120, the QMM 126 may tag the memory location with the transferred qubit as used. If the lifetime timer for the storage location of the destination qubit expires before the information qubit is transferred, then the QMM 126 may tag the memory location as expired. Expired memory locations may be repopulated to prepare for the next communication epoch, and the presence of expired memory locations may be used to adjust the parameters of the quantum communication channel as described with respect to FIG. 9A and FIG. 9B.

The act of repopulating the memory locations with entangled pair halves at the source endpoint 110 and/or the destination endpoint 120 may include a final swap and measurement to store the communication qubit in the medium of the quantum memory. The network entanglement manager 160 continues to send entanglement responses 720 and 725 to the source endpoint 110 and the destination endpoint 120 until at least the requested number of qubits for the communication epoch has been stored in the respective quantum memories. The network entanglement manager 160 may send more than the requested number of entangled pairs of qubits, e.g., to allow for potential losses or to facilitate future communication epochs.

As the entangled pairs of qubits are populated in the quantum memories of the source endpoint 110 and the destination endpoint 120, the QMM 116 and the QMM 126 monitor the number of stored qubits until a minimum level that was negotiated for the communication channel. Once the minimum number of entangled qubits have been stored at the source endpoint 110 and the destination endpoint 120, then the QMM 116 provides a ready message 740 to the quantum application 112 indicating that the quantum communication channel is ready for use. Similarly, the QMM 126 provides a ready message 745 to the quantum application 122 indicating that the quantum communication channel is ready for use. In one example, the ready message 740 and the ready message 745 may include the application identifier (e.g., AppID) and the request identifier (e.g., ReqID). Once the quantum application 112 and the quantum application 122 obtain the ready message 740 and the ready message 745, respectively, the quantum application 112 may begin transferring information qubits to the quantum application 122 in the next communication epoch.

Referring now to FIG. 8, a flowchart illustrates an example process 800 performed by a source endpoint (e.g., source endpoint 110) to prepare a quantum communication channel. At 810, a quantum memory manager of the source endpoint obtains a memory request for one or more quantum memory blocks. In one example, the memory request includes an application identifier of a quantum application at the source endpoint. At 820, the source endpoint negotiates with the destination endpoint to determine a memory lifetime value that includes a minimum decoherence time for qubits stored at the source endpoint and qubits stored at the destination endpoint. In one example, quantum applications at the source endpoint and the destination endpoint negotiate the memory lifetime value. Alternatively, quantum memory managers at the source endpoint and the destination endpoint may negotiate the memory lifetime value. In another example, the memory lifetime value may include a safety margin to shorten the memory lifetime value.

At 830, the source endpoint allocates a quantum memory block the quantum application based on the memory lifetime value. The quantum memory block includes a plurality of qubit storage locations. At 840, the source endpoint receives one or more communication qubits that are entangled with one or more destination qubits sent to the destination endpoint. Each particular communication qubit is entangled with a particular destination qubit of the one or more destination qubits. In other words, each communication qubit is part of an entangled pair with one of the destination qubits.

At 850, the source endpoint stores the one or more communication qubit in the quantum memory block. In one example, the source endpoint stores the communication qubit in a storage pair that includes a first qubit storage location for the communication qubit and a second qubit storage location for an information qubit to be transferred to the destination endpoint. Additionally, the quantum memory manager of the source endpoint may tag the storage pair as unallocated when the communication qubit is stored in the first qubit storage location.

Figure 9A:
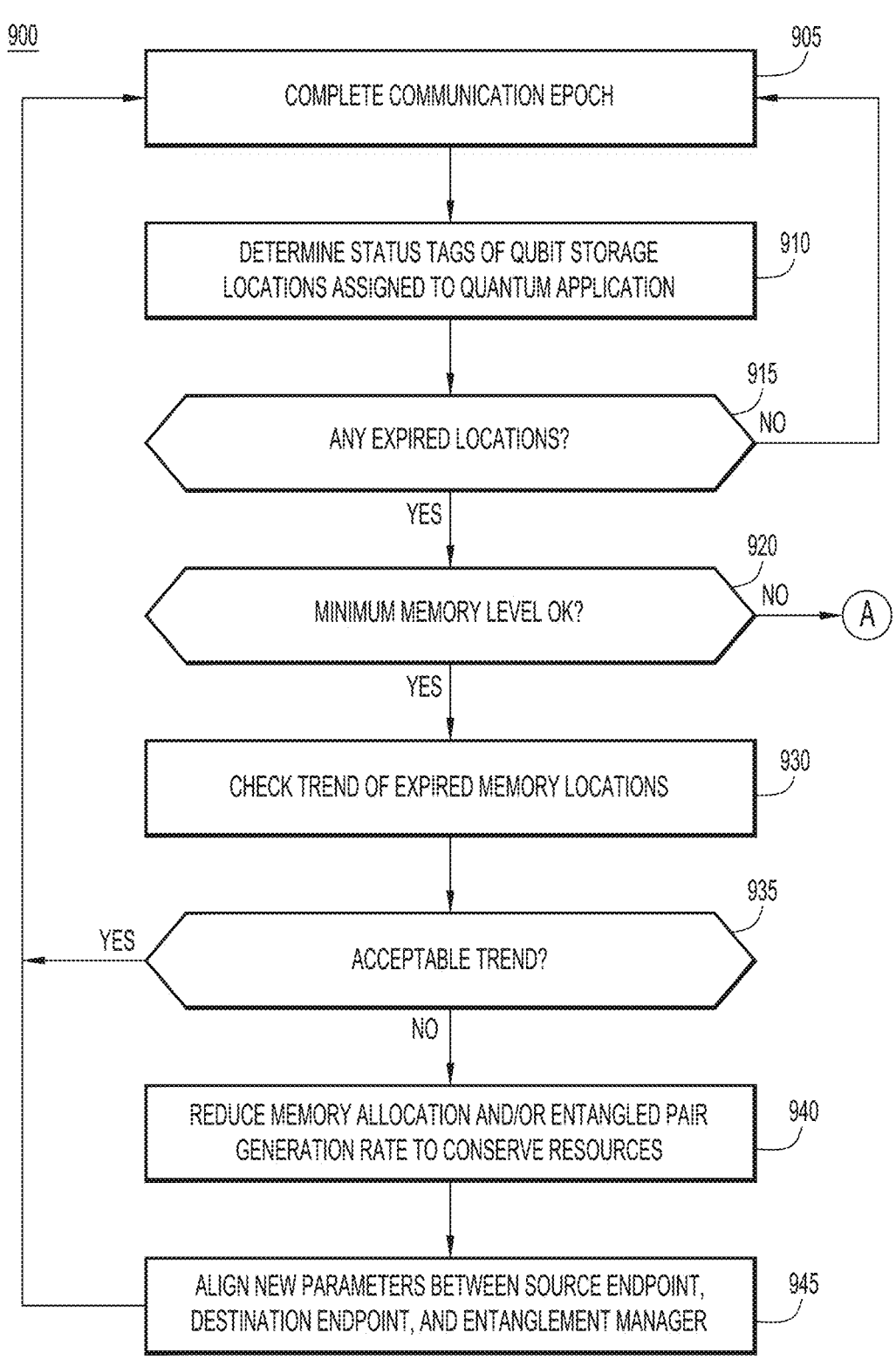
FIG. 9A and FIG. 9B are flowcharts illustrating operations performed by a quantum memory manager to handle expired quantum memory locations, according to an example embodiment.
Figure 9B:
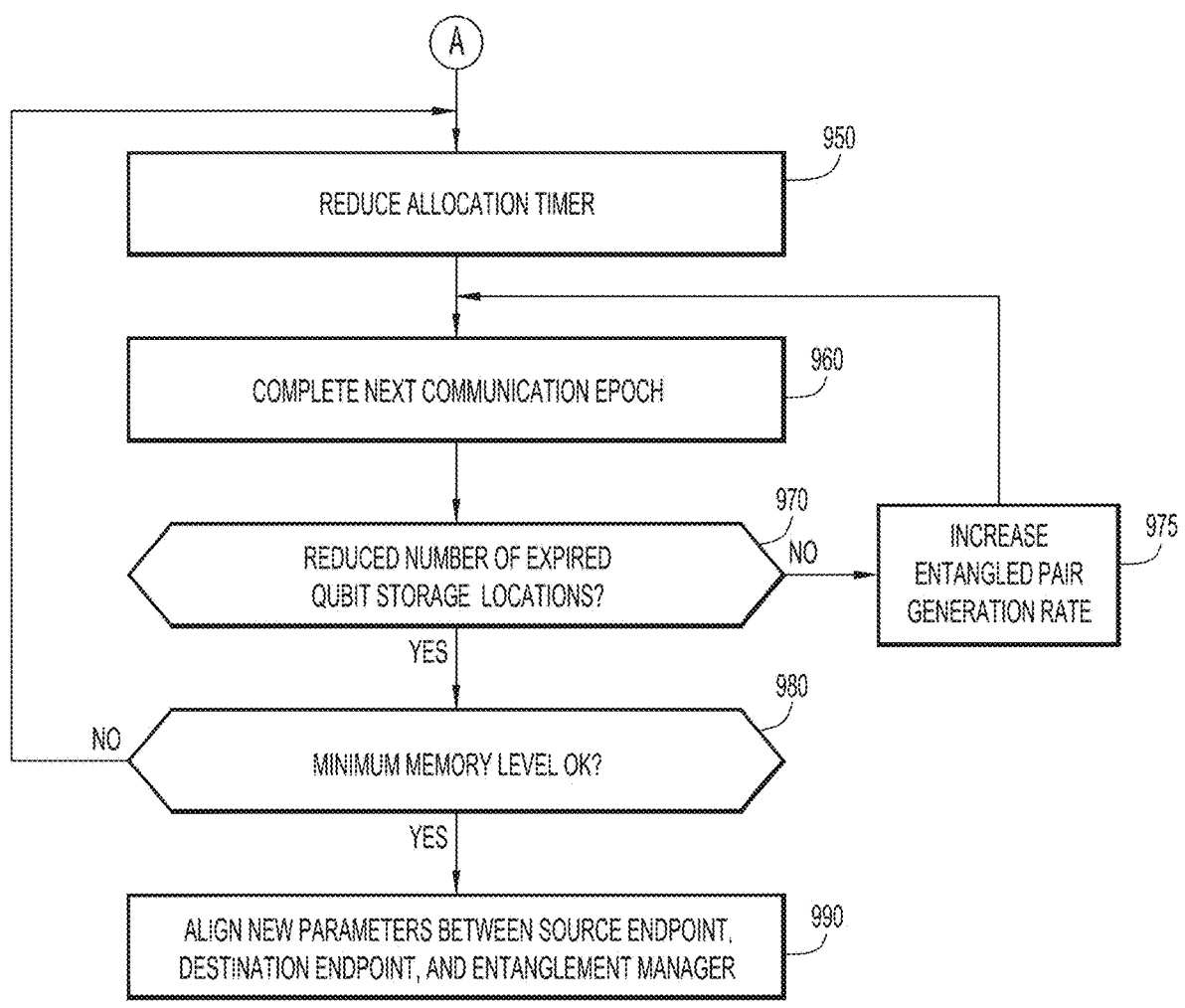

Referring now to FIG. 9A and FIG. 9B, a flowchart illustrates an example process 900 performed by an endpoint (e.g., source endpoint 110 or destination endpoint 120) to adjust the memory allocation and provisioning to minimize under allocating or over allocating quantum networking/memory resources. Under allocation may lead to the quantum communication channel between the source endpoint and the destination endpoint stalling. Over allocation may lead to a waste of potentially expensive resources. The example process 900 describes one example of a memory expiry handling process to adjust the allocation of resources between communication epochs.

After completing a communication epoch at 905, the endpoint determines the status of the tags of qubit storage locations in the quantum memory block assigned to the quantum application at 910. In one example, a source endpoint may determine the status of the tags of storage pairs of qubit storage locations, which are configured to store a communication qubit and an associated information qubit. A destination endpoint may determine the status tags of a qubit storage location that is configured to store a destination qubit. The destination qubit stored at the destination endpoint and the communication qubit stored at the source endpoint form an entangled pair of qubits. If there are no expired qubit storage locations, as determined at 915, then the endpoint returns to complete the next communication epoch at 905 without any changes to the quantum channel parameters.

If the endpoint does detect one or more expired qubit storage locations at 915, then one or more of the communication qubit, the destination qubit, or the information qubit has decohered before the quantum teleportation process could complete. The endpoint determines at 920 whether the endpoint still has sufficient unexpired qubit storage locations to satisfy the minimum memory level for continuing with the next communication epoch. If the endpoint has insufficient unexpired qubit storage locations, then the memory is under allocated. When the memory is under allocated, the endpoint continues the process 900 as described further with respect to FIG. 9B.

If the endpoint has sufficient unexpired memory resources to satisfy the minimum memory level, as determined at 920, then the endpoint continues to have sufficient memory to continue the communication session with the next epoch. However, determining that the endpoint has expired qubit storage locations while still satisfying the minimum memory level indicates the potential for over allocation of memory resources for the desired rate of communication. The endpoint checks the trend of expired qubit storage locations at 930 to determine whether an adjustment is needed. For instance, if the number of expired qubit storage locations has increased or remained above a predetermined threshold for a predetermined number of communication epochs, then the endpoint may determine that the endpoint is over allocated. In contrast, if the number of expired qubit storage locations has decreased for a predetermined number of communication epochs, then the endpoint may be properly allocated or under allocated.

If the trend is acceptable for continuing the quantum communication, as determined at 935, then the endpoint returns to complete the next communication epoch at 905. If the trend is not acceptable and the endpoint is over allocated, then the endpoint adjusts the communication parameters at 940 to conserve memory resources. In one example, the endpoint may reduce the number of qubit storage locations assigned to the quantum memory block of the quantum application. In another example, the endpoint may decrease the entangled pair generation rate to conserve quantum networking resources. The endpoint aligns the news parameters between the peer endpoints and the network entanglement manager at 945 and the process 900 returns to complete the next communication epoch at 905.

Referring now to FIG. 9B, a flowchart illustrates the continuation of the example process 900 started in FIG. 9A with expired memory handling for an endpoint that is under allocated. If the endpoint has insufficient unexpired qubit storage locations (i.e., the minimum memory level is not met), then the endpoint reduces the allocation timer at 950 to determine the cause of the expired memory condition. For instance, expired qubit storage locations may be caused by the endpoint not being able to process all of the qubits before the qubit storage locations expire. Alternatively, a low rate of generation of entangled pairs by the network entanglement manager may also cause qubit storage locations to expire and not be repopulated.

After reducing the allocation timer, the endpoint completes the next communication epoch at 960. If adjusting the allocation timer has minimal effect on the number of expired qubit storage locations, as determined at 970, then a low rate of entangled pair generation may be the cause of the expired qubit storage locations, and the endpoint directs the network entanglement manager to increase the generation rate of entangled pairs at 975. The process 900 returns to compete the next communication epoch at 960 to see if increasing the generation rate of entangled pairs has resolved the issue of expired qubit storage locations.

If the endpoint determines that number of expired qubit storage locations is reduced due to the reduced allocation timer, as determined at 970, then the endpoint continues reducing the allocation timer until the minimum memory level is satisfied, as determined at 980. Once the endpoint determines that minimum memory level is satisfied, then the endpoint aligns the new parameters between the peer endpoints and the network entanglement manager at 990. The process 900 may then return to continue with the next communication epoch at 905.

Figure 10:
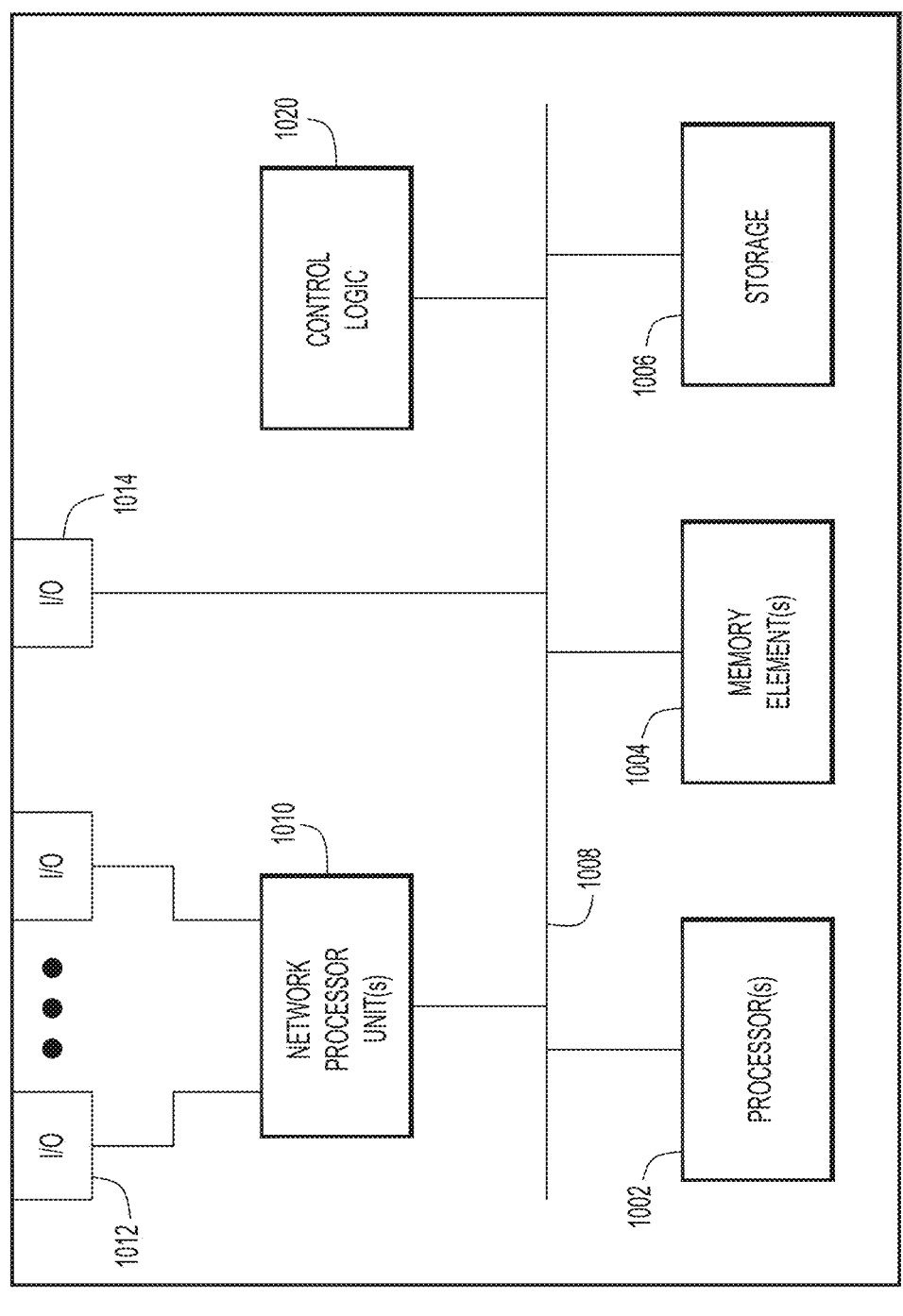
FIG. 10 is a block diagram of a computing device that may be configured to perform the techniques presented herein, according to an example embodiment.

Referring to FIG. 10, FIG. 10 illustrates a hardware block diagram of a computing device 1000 that may perform functions associated with operations discussed herein in connection with the techniques depicted in FIGS. 1-8, 9A, and 9B. In various embodiments, a computing device, such as computing device 1000 or any combination of computing devices 1000, may be configured as any entity/entities as discussed for the techniques depicted in connection with FIGS. 1-8, 9A, and 9B in order to perform operations of the various techniques discussed herein.

In at least one embodiment, the computing device 1000 may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020. In various embodiments, instructions associated with logic for computing device 1000 can overlap in any manner and are not limited to the specific allocation of instructions and/or operations described herein.

In at least one embodiment, processor(s) 1002 is/are at least one hardware processor configured to execute various tasks, operations and/or functions for computing device 1000 as described herein according to software and/or instructions configured for computing device 1000. Processor(s) 1002 (e.g., a hardware processor) can execute any type of instructions associated with data to achieve the operations detailed herein. In one example, processor(s) 1002 can transform an element or an article (e.g., data, information, classical bits, qubits) from one state or thing to another state or thing. Any of potential classical processing elements, quantum processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1004 and/or storage 1006 is/are configured to store quantum data, classical data, information, software, and/or instructions associated with computing device 1000, and/or logic configured for memory element(s) 1004 and/or storage 1006. For example, any logic described herein (e.g., control logic 1020) can, in various embodiments, be stored for computing device 1000 using any combination of memory element(s) 1004 and/or storage 1006. Note that in some embodiments, storage 1006 can be consolidated with memory element(s) 1004 (or vice versa), or can overlap/exist in any other suitable manner.

In at least one embodiment, bus 1008 can be configured as an interface that enables one or more elements of computing device 1000 to communicate in order to exchange information and/or data. Bus 1008 can be implemented with any architecture designed for passing control, data and/or information between processors, memory elements/storage, peripheral devices, and/or any other hardware and/or software components that may be configured for computing device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between computing device 1000 and other systems, entities, etc., via network I/O interface(s) 1012 (wired and/or wireless) to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1012 can be configured as one or more Ethernet port(s), Fibre Channel ports, any other I/O port(s), and/or antenna(s)/antenna array(s) now known or hereafter developed. Thus, the network processor unit(s) 1010 and/or network I/O interface(s) 1012 may include suitable interfaces for receiving, transmitting, and/or otherwise communicating data and/or information in a classical network environment.

I/O interface(s) 1014 allow for input and output of data and/or information with other entities that may be connected to computing device 1000. For example, I/O interface(s) 1014 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store classical data/information or quantum data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), light quantum memory, solid quantum memory, etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/ information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory element(s) 1004 and/or storage 1006 being able to store classical data, quantum data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In summary, the techniques presented herein manage quantum communication and entanglement by managing activity within blocks of quantum memory with a quantum memory manager. Any requirement to refresh the quantum memory because of expiration or use may now be communicated to the quantum network and link layers in a single message per application per communication epoch. Additionally, the measurement results may be tracked be referring to a location within an allocated quantum memory block. In other words, the measurement signal message sent to the destination endpoint may be optimized by aggregating the measurement results for multiple qubits.

Application driven memory allocation by the quantum memory manager sets the minimum level of memory required for communication once the quantum memory is assigned to an application. The quantum memory manager and the quantum application may monitor the minimum memory level through a minimum memory level flag, which provides an indicator of when quantum communication is available. The quantum memory managers ant the source endpoint and the destination endpoint may calculate the number of used qubit storage locations in the quantum memory block at the end of the allocation timer. The number of used qubit storage locations may be adjusted to include any expired qubit storage locations through a memory expiry handling process.

In some aspects, the techniques described herein relate to a method including: obtaining at a quantum memory manager of a source endpoint, a memory request for one or more quantum memory blocks, the memory request including an application identifier of a quantum application at the source endpoint; negotiating with a destination endpoint to determine a memory lifetime value that includes a minimum decoherence time for qubits stored at the source endpoint and qubits stored at the destination endpoint; allocating a quantum memory block to the quantum application based on the memory lifetime value, wherein the quantum memory block includes a plurality of qubit storage locations; receiving one or more communication qubits that are entangled with one or more destination qubits sent to the destination endpoint, wherein each particular communication qubit of the one or more communication qubits is entangled with a particular destination qubit of the one or more destination qubits; and storing one or more communication qubits in the quantum memory block.

In some aspects, the techniques described herein relate to a method, further including: setting an allocation timer to expire in less than the memory lifetime value; obtaining one or more information qubits from the quantum application; storing the one or more information qubits in the quantum memory block, wherein each specific information qubit in the one or more information qubits is associated with a specific communication qubit of the one or more communication qubits; and responsive to an expiration of the allocation timer, teleporting the one or more information qubits to the destination endpoint using the one or more communication qubits.

In some aspects, the techniques described herein relate to a method, further including repopulating the quantum memory block with a new set of communication qubits.

In some aspects, the techniques described herein relate to a method, further including responsive to at least one of the one or more communication qubits decohering before an associated information qubit is teleported to the destination endpoint, adjusting the allocation timer.

In some aspects, the techniques described herein relate to a method, wherein teleporting includes: measuring one or more composite states to generate measurement results, each composite state combining a corresponding communication qubit with the associated information qubit; and providing the measurement results to the destination endpoint enabling the destination endpoint to transform the one or more destination qubits to the one or more information qubits through unitary transformations based on the measurement results.

In some aspects, the techniques described herein relate to a method, wherein negotiating with the destination endpoint to determine the memory lifetime value includes the quantum application at the source endpoint communicating with a corresponding quantum application at the destination endpoint or the quantum memory manager at the source endpoint communicating with a corresponding quantum memory manager at the destination endpoint.

In some aspects, the techniques described herein relate to a method, further including sending a network request for one or more entangled pairs of qubits from a quantum network entanglement manager, the network request identifying the destination endpoint and including the application identifier, wherein the network request causes the quantum network entanglement manager to send the one or more communication qubits to the source endpoint and the one or more destination qubits to the destination endpoint.

In some aspects, the techniques described herein relate to a method, further including tagging a pair of qubit storage locations of the plurality of qubit storage locations with a label indicating whether the pair of qubit storage locations is unallocated, allocated, used, or expired, wherein the pair of qubit storage locations includes a communication qubit storage location and an information qubit storage location.

In some aspects, the techniques described herein relate to a method, wherein an unallocated label indicates that the communication qubit storage location stores a first communication qubit among the one or more communication qubits.

In some aspects, the techniques described herein relate to a method, wherein an allocated label indicates that the pair of qubit storage locations stores a composite state between a first communication qubit among the one or more communication qubits and a first information qubit among the one or more information qubits.

In some aspects, the techniques described herein relate to a method, wherein a used label indicates that the composite state between the first communication qubit and the first information qubit has been measured.

In some aspects, the techniques described herein relate to a method, wherein an expired label indicates that at least one of the first communication qubit or the first information qubit has decohered before the composite state has been measured.

In some aspects, the techniques described herein relate to an apparatus including: a network interface configured to communicate with computing devices in a classical computer network; a quantum memory storage device; and a processor coupled to the network interface and the quantum memory storage device, the processor configured to: obtain at a quantum memory manager of a source endpoint, a memory request for one or more quantum memory blocks in the quantum memory storage device, the memory request including an application identifier of a quantum application at the source endpoint; negotiate through the network interface with a destination endpoint to determine a memory lifetime value that includes a minimum decoherence time for qubits stored in the quantum memory storage device and qubits stored at the destination endpoint; allocate a quantum memory block in the quantum memory storage device to the quantum application based on the memory lifetime value, wherein the quantum memory block includes a plurality of qubit storage locations; receive one or more communication qubits that are entangled with one or more destination qubits sent to the destination endpoint, wherein each particular communication qubit of the one or more communication qubits is entangled with a particular destination qubit of the one or more destination qubits; and store the one or more communication qubits in the quantum memory block.

In some aspects, the techniques described herein relate to an apparatus, wherein the processor is further configured to: set an allocation timer to expire in less than the memory lifetime value; obtain one or more information qubits from the quantum application; store one or more information qubits in the quantum memory block, wherein each specific information qubit of the one or more information qubits is associated with a specific communication qubit of the one or more communication qubits; and responsive to an expiration of the allocation timer, teleport the one or more information qubits to the destination endpoint using the one or more communication qubits.

In some aspects, the techniques described herein relate to an apparatus, wherein the processor is configured to teleport the one or more information qubits to the destination endpoint by: measuring one or more composite states to generate measurement results, each composite state of the one or more composite states combining a corresponding communication qubit with the associated information qubit; and causing the network interface to provide the measurement results to the destination endpoint enabling the destination endpoint to transform the one or more destination qubits to the one or more information qubits through unitary transformations based on the measurement results.

In some aspects, the techniques described herein relate to an apparatus, wherein the processor is further configured to tag a pair of qubit storage locations of the plurality of qubit storage locations with a label indicating whether the pair of qubit storage locations is unallocated, allocated, used, or expired, wherein the pair of qubit storage locations includes a communication qubit storage location and an information qubit storage location.

In some aspects, the techniques described herein relate to one or more non-transitory computer readable storage media encoded with software including computer executable instructions that, when the software is executed on a source endpoint, is operable to cause a processor of the source endpoint to: obtain at a quantum memory manager of the source endpoint, a memory request for one or more quantum memory blocks, the memory request including an application identifier of a quantum application at the source endpoint; negotiate with a destination endpoint to determine a memory lifetime value that includes a minimum decoherence time for qubits stored at the source endpoint and qubits stored at the destination endpoint; allocate a quantum memory block to the quantum application based on the memory lifetime value, wherein the quantum memory block includes a plurality of qubit storage locations; receive one or more communication qubits that are entangled with one or more destination qubits sent to the destination endpoint, wherein each particular communication qubit of the one or more communication qubits is entangled with a particular destination qubit of the one or more destination qubits; and store the one or more communication qubits.

In some aspects, the techniques described herein relate to one or more non-transitory computer readable storage media, wherein the software is further operable to cause the processor to: set an allocation timer to expire in less than the memory lifetime value; obtain one or more information qubits from the quantum application; store the one or more information qubits, wherein each specific information qubit of the one or more information qubits is associated with a specific communication qubit of the one or more communication qubits; and responsive to an expiration of the allocation timer, teleport the one or more information qubits to the destination endpoint using the one or more communication qubits.

In some aspects, the techniques described herein relate to one or more non-transitory computer readable storage media, wherein the software is further operable to cause the processor to teleport the one or more information qubits to the destination endpoint by: measuring one or more composite states to generate measurement results, each composite state of the one or more composite states combining a corresponding communication qubit with the associated information qubit; and providing the measurement results to the destination endpoint enabling the destination endpoint to transform the one or more destination qubits to the one or more information qubits through unitary transformations based on the measurement results.

In some aspects, the techniques described herein relate to one or more non-transitory computer readable storage media, wherein the software is further operable to cause the processor to tag a pair of qubit storage locations of the plurality of qubit storage locations with a label indicating whether the pair of qubit storage locations is unallocated, allocated, used, or expired, wherein the pair of qubit storage locations includes a communication qubit storage location and an information qubit storage location.

Each example embodiment disclosed herein has been included to present one or more different features. However, all disclosed example embodiments are designed to work together as part of a single larger system or method. The disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining at a quantum memory manager of a source endpoint, a memory request for one or more quantum memory blocks, the memory request including an application identifier of a quantum application at the source endpoint;
negotiating with a destination endpoint to determine a memory lifetime value that includes a minimum decoherence time for qubits stored at the source endpoint and qubits stored at the destination endpoint;
allocating a quantum memory block to the quantum application based on the memory lifetime value, wherein the quantum memory block includes a plurality of qubit storage locations;
receiving one or more communication qubits from a quantum network entanglement manager that entangles the one or more communication qubits with one or more destination qubits sent to the destination endpoint, wherein each particular communication qubit of the one or more communication qubits is entangled with a particular destination qubit of the one or more destination qubits for teleportation;
storing the one or more communication qubits in the quantum memory block;
tagging one or more qubit storage locations of the plurality of qubit storage locations with a label indicating that the one or more qubit storage locations have expired when a qubit of the one or more qubit storage locations has decohered before measurement; and
adjusting a number of qubit storage locations of the quantum memory block allocated to the quantum application based on a number of qubit storage locations tagged as expired over a predetermined number of epochs of communication between the source endpoint and the destination endpoint.

2. The method of claim 1, further comprising:
setting an allocation timer to expire in less than the memory lifetime value;
obtaining one or more information qubits from the quantum application;
storing the one or more information qubits in the quantum memory block, wherein each specific information qubit in the one or more information qubits is associated with a specific communication qubit of the one or more communication qubits; and
responsive to an expiration of the allocation timer, teleporting the one or more information qubits to the destination endpoint using the one or more communication qubits.

3. The method of claim 2, further comprising repopulating the quantum memory block with a new set of communication qubits.

4. The method of claim 2, further comprising responsive to at least one of the one or more communication qubits decohering before an associated information qubit is teleported to the destination endpoint, adjusting the allocation timer.

5. The method of claim 2, wherein teleporting comprises:
measuring one or more composite states to generate measurement results, each composite state combining a corresponding communication qubit with an associated information qubit; and
providing the measurement results to the destination endpoint enabling the destination endpoint to transform the one or more destination qubits to the one or more information qubits through unitary transformations based on the measurement results.

6. The method of claim 2, further comprising tagging a pair of qubit storage locations of the plurality of qubit storage locations with a label indicating whether the pair of qubit storage locations is unallocated, allocated, used, or expired, wherein the pair of qubit storage locations includes a communication qubit storage location and an information qubit storage location.

7. The method of claim 6, wherein an unallocated label indicates that the communication qubit storage location stores a first communication qubit among the one or more communication qubits.

8. The method of claim 6, wherein an allocated label indicates that the pair of qubit storage locations stores a composite state between a first communication qubit among the one or more communication qubits and a first information qubit among the one or more information qubits.

9. The method of claim 8, wherein a used label indicates that the composite state between the first communication qubit and the first information qubit has been measured.

10. The method of claim 8, wherein an expired label indicates that at least one of the first communication qubit or the first information qubit has decohered before the composite state has been measured.

11. The method of claim 1, wherein negotiating with the destination endpoint to determine the memory lifetime value comprises the quantum application at the source endpoint communicating with a corresponding quantum application at the destination endpoint or the quantum memory manager at the source endpoint communicating with a corresponding quantum memory manager at the destination endpoint.

12. The method of claim 1, further comprising sending a network request for one or more entangled pairs of qubits from the quantum network entanglement manager, the network request identifying the destination endpoint and including the application identifier, wherein the network request causes the quantum network entanglement manager to send the one or more communication qubits to the source endpoint and the one or more destination qubits to the destination endpoint.

13. An apparatus comprising:
a network interface configured to communicate with computing devices in a classical computer network;
a quantum memory storage device; and
a processor coupled to the network interface and the quantum memory storage device, the processor configured to perform operations including:
obtaining at a quantum memory manager of a source endpoint, a memory request for one or more quantum memory blocks in the quantum memory storage device, the memory request including an application identifier of a quantum application at the source endpoint;

negotiating through the network interface with a destination endpoint to determine a memory lifetime value that includes a minimum decoherence time for qubits stored in the quantum memory storage device and qubits stored at the destination endpoint;

allocating a quantum memory block in the quantum memory storage device to the quantum application based on the memory lifetime value, wherein the quantum memory block includes a plurality of qubit storage locations;

receiving one or more communication qubits from a quantum network entanglement manager that entangles the one or more communication qubits with one or more destination qubits sent to the destination endpoint, wherein each particular communication qubit of the one or more communication qubits is entangled with a particular destination qubit of the one or more destination qubits for teleportation;

storing the one or more communication qubits in the quantum memory block;

tagging one or more qubit storage locations of the plurality of qubit storage locations with a label indicating that the one or more qubit storage locations have expired when a qubit of the one or more qubit storage locations has decohered before measurement; and adjusting a number of qubit storage locations of the quantum memory block allocated to the quantum application based on a number of qubit storage locations tagged as expired over a predetermined number of epochs of communication between the source endpoint and the destination endpoint.

14. The apparatus of claim 13, wherein the processor is further configured to perform further operations including:

setting an allocation timer to expire in less than the memory lifetime value;

obtaining one or more information qubits from the quantum application;

storing one or more information qubits in the quantum memory block, wherein each specific information qubit of the one or more information qubits is associated with a specific communication qubit of the one or more communication qubits; and responsive to an expiration of the allocation timer, teleporting the one or more information qubits to the destination endpoint using the one or more communication qubits.

15. The apparatus of claim 14, wherein the processor is configured to perform further operations including teleporting the one or more information qubits to the destination endpoint by:

measuring one or more composite states to generate measurement results, each composite state of the one or more composite states combining a corresponding communication qubit with an associated information qubit; and causing the network interface to provide the measurement results to the destination endpoint enabling the destination endpoint to transform the one or more destination qubits to the one or more information qubits through unitary transformations based on the measurement results.

16. The apparatus of claim 14, wherein the processor is configured to perform further operations including tagging a pair of qubit storage locations of the plurality of qubit storage locations with a label indicating whether the pair of qubit storage locations is unallocated, allocated, used, or expired, wherein the pair of qubit storage locations includes a communication qubit storage location and an information qubit storage location.

17. One or more non-transitory computer readable storage media encoded with software comprising computer executable instructions that, when the software is executed on a source endpoint, is operable to cause a processor of the source endpoint to perform operations including:

obtaining at a quantum memory manager of the source endpoint, a memory request for one or more quantum memory blocks, the memory request including an application identifier of a quantum application at the source endpoint;

negotiating with a destination endpoint to determine a memory lifetime value that includes a minimum decoherence time for qubits stored at the source endpoint and qubits stored at the destination endpoint;

allocating a quantum memory block to the quantum application based on the memory lifetime value, wherein the quantum memory block includes a plurality of qubit storage locations;

receiving one or more communication qubits from a quantum network entanglement manager that entangles the one or more communication qubits with one or more destination qubits sent to the destination endpoint, wherein each particular communication qubit of the one or more communication qubits is entangled with a particular destination qubit of the one or more destination qubits for teleportation;

storing the one or more communication qubits in the quantum memory block;

tagging one or more qubit storage locations of the plurality of qubit storage locations with a label indicating that the one or more qubit storage locations have expired when a qubit of the one or more qubit storage locations has decohered before measurement; and adjusting a number of qubit storage locations of the quantum memory block allocated to the quantum application based on a number of qubit storage locations tagged as expired over a predetermined number of epochs of communication between the source endpoint and the destination endpoint.

18. The one or more non-transitory computer readable storage media of claim 17, wherein the software is operable to cause the processor to perform further operations including:

setting an allocation timer to expire in less than the memory lifetime value;

obtaining one or more information qubits from the quantum application;

storing the one or more information qubits, wherein each specific information qubit of the one or more information qubits is associated with a specific communication qubit of the one or more communication qubits; and responsive to an expiration of the allocation timer, teleporting the one or more information qubits to the destination endpoint using the one or more communication qubits.

19. The one or more non-transitory computer readable storage media of claim 18, wherein the software is operable to cause the processor to perform further operations including teleporting the one or more information qubits to the destination endpoint by:

measuring one or more composite states to generate measurement results, each composite state of the one or more composite states combining a corresponding communication qubit with an associated information qubit; and providing the measurement results to the destination endpoint enabling the destination endpoint to transform the one or more destination qubits to the one or more information qubits through unitary transformations based on the measurement results.

20. The one or more non-transitory computer readable storage media of claim 18, wherein the software is operable to cause the processor to perform further operations including tagging a pair of qubit storage locations of the plurality of qubit storage locations with a label indicating whether the pair of qubit storage locations is unallocated, allocated, used, or expired, wherein the pair of qubit storage locations includes a communication qubit storage location and an information qubit storage location.

\* \* \* \* \*